United States Patent
Minamiyama et al.

(10) Patent No.: US 9,728,285 B2
(45) Date of Patent: Aug. 8, 2017

(54) WATER JET PEENING APPARATUS AND WATER JET PEENING METHOD

(71) Applicant: MITSUBISHI HEAVY INDUSTRIES, LTD., Tokyo (JP)

(72) Inventors: Akio Minamiyama, Tokyo (JP); Yutaka Nishitsuji, Tokyo (JP); Koji Okimura, Tokyo (JP); Kazuyuki Hinami, Tokyo (JP); Tomochika Hamamoto, Tokyo (JP); Takao Konno, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 58 days.

(21) Appl. No.: 14/762,217
(22) PCT Filed: Jan. 23, 2014
(86) PCT No.: PCT/JP2014/051394
§ 371 (c)(1),
(2) Date: Jul. 21, 2015
(87) PCT Pub. No.: WO2014/115812
PCT Pub. Date: Jul. 31, 2014

(65) Prior Publication Data
US 2015/0348659 A1   Dec. 3, 2015

(30) Foreign Application Priority Data

Jan. 25, 2013  (JP) ................................. 2013-012503

(51) Int. Cl.
*G21C 19/28*  (2006.01)
*B24C 1/00*  (2006.01)
(Continued)

(52) U.S. Cl.
CPC .............. *G21C 19/28* (2013.01); *B24C 1/003* (2013.01); *B24C 1/10* (2013.01); *B24C 3/325* (2013.01);
(Continued)

(58) Field of Classification Search
CPC .. G21C 19/28; B24C 5/02; B24C 5/04; B24C 3/02; B24C 3/325
See application file for complete search history.

(56) References Cited

U.S. PATENT DOCUMENTS 3,850,241 A * 11/1974 Hutchinson ............. E21B 37/08
166/222
5,388,131 A    2/1995 Batistoni et al.
(Continued)

FOREIGN PATENT DOCUMENTS

JP    9-136261 A    5/1997
JP    10-10282 A    1/1998
(Continued)

OTHER PUBLICATIONS

English translation of Written Opinion of ISA dated Mar. 18, 2014, issued in counterpart application No. PCT/JP2014/051394 (7 pages).
(Continued)

*Primary Examiner* — Moshe Wilensky
*Assistant Examiner* — Joseph Finan, Jr.
(74) *Attorney, Agent, or Firm* — Westerman, Hattori, Daniels & Adrian, LLP

(57) ABSTRACT

Provided is a water jet peening apparatus and a water jet peening method including: a clamping cylinder (201) which is able to be disposed at the outer peripheral side of an instrumentation nozzle (83) with a predetermined gap therebetween; a clamping piece (210) which is able to fix the clamping cylinder (201) to the instrumentation nozzle (83); a nozzle guide (221) which has a cylindrical shape, is provided inside the clamping cylinder (201), and is positioned to a position adjacent to the upper end of the instrumentation nozzle (83); an inner surface WJP nozzle (105) which is movable upward and downward inside the nozzle guide (221); and a drainage hole (224) which radially penetrates the nozzle guide (221). Accordingly, it is possible (Continued)

to improve the safety of the operation by preventing a thimble tube from being popped out due to a water jet peening operation.

3 Claims, 16 Drawing Sheets

(51) Int. Cl.
| | |
|---|---|
| B24C 1/10 | (2006.01) |
| B24C 3/32 | (2006.01) |
| G21C 17/01 | (2006.01) |
| G21C 17/017 | (2006.01) |
| G21C 19/20 | (2006.01) |
| G21C 17/108 | (2006.01) |

(52) U.S. Cl.
  CPC .......... *G21C 17/01* (2013.01); *G21C 17/017* (2013.01); *G21C 19/20* (2013.01); *G21C 19/207* (2013.01); *G21C 17/108* (2013.01)

(56) References Cited

U.S. PATENT DOCUMENTS

| | | | | |
|---|---|---|---|---|
| 5,418,824 | A | * | 5/1995 | Monserud ............... B08B 9/023 134/167 C |
| 6,341,151 | B1 | | 1/2002 | Enomoto et al. |
| 2009/0029631 | A1 | * | 1/2009 | Offer ..................... B24D 13/10 451/28 |

FOREIGN PATENT DOCUMENTS

| | | |
|---|---|---|
| JP | 2006-201141 A | 8/2006 |
| JP | 2011-83892 A | 4/2011 |
| JP | 2013-154439 A | 8/2013 |

OTHER PUBLICATIONS

Decision of Patent Grant dated Feb. 2, 2016, issued in counterpart Japanese Patent Application No. 2014-558617, with English translation (3 pages).

Extended (Supplementary) European Search Report dated Apr. 28, 2016, issued in counterpart European Patent Application No. 14743538.2. (7 pages).

English translation of Written Opinion of ISA dated Mar. 3, 2014, issued in counterpart application No. PCT/JP2014/051394 (7 pages).

International Search Report dated Mar. 18, 2014, issued in counterpart application No. PCT/JP2014/051394 (6 pages).

Written Opinion of the International Searching Authority dated Mar. 18, 2014, issued in counterpart application No. PCT/JP2014/051394 (3 pages).

Office Action dated Oct. 31, 2016, issued in counterpart Korean Application No. 10-2015-7019619, with partial English translation (4 pages).

* cited by examiner

WATER JET PEENING APPARATUS AND WATER JET PEENING METHOD

FIELD

The present invention relates to a water jet peening apparatus and a water jet peening method used to repair a nozzle provided in a nuclear reactor vessel and the vicinity thereof.

BACKGROUND

For example, a nuclear power plant that includes a pressurized water reactor (PWR) uses light water as a nuclear reactor coolant and a neutron moderator while keeping the light water as high-temperature and high-pressure water which is not boiled throughout a reactor core, sends the high-temperature and high-pressure water to a steam generator so as to generate a steam by a heat exchange operation, and sends the steam to a turbine generator so as to generate electric power.

In such a nuclear power plant, there is a need to periodically inspect various structures of the pressurized water reactor in order to ensure sufficient safety or reliability. Then, when a problem is found after various inspections, a necessary portion involved with the problem is repaired. For example, in the pressurized water reactor, a nuclear reactor vessel body is provided with a plurality of instrumentation nozzles penetrating a lower end plate. Further, each of the instrumentation nozzles is formed so that an in-core instrumentation guide pipe is fixed to the upper end thereof inside the reactor and a conduit tube is connected to the lower end thereof outside the reactor. Then, a neutron flux detector capable of measuring a neutron flux is insertable from the instrumentation nozzle to a reactor core (a fuel assembly) through the in-core instrumentation guide pipe by using the conduit tube.

The instrumentation nozzle is formed in a manner such that an in-core instrumentation cylinder is welded while being fitted into an attachment hole of a nuclear reactor vessel body. For that reason, there is a possibility that a tensile stress may remain in the in-core instrumentation cylinder, the welding portion of the in-core instrumentation cylinder, and the vicinity thereof. Thus, there is an increase in the possibility of stress corrosion cracking due to the long-term use. Here, as the related art, a water jet peening technique is known which prevents stress corrosion cracking by solving a residual tensile stress of a surface by a residual compressive stress. In the water jet peening operation, high-pressure water including cavitation air bubbles is jetted to a surface of a metal member under water so as to solve a residual tensile stress of the surface of the metal member by a residual compressive stress. As such a water jet peening apparatus, for example, an example is disclosed in Patent Literature 1 as below.

CITATION LIST

Patent Literature

Patent Literature 1: JP 2006-201141 A

SUMMARY

Technical Problem

Incidentally, in a case where the water jet peening operation is performed on the inner surface of the instrumentation nozzle (the in-core instrumentation cylinder), a neutron flux detector which is disposed inside the instrumentation nozzle is extracted by a predetermined length to the outside (the lower portion) through a conduit tube along with a thimble tube. However, when the water jet peening operation is performed on the inner surface of the in-core instrumentation cylinder, the pressure of the in-core instrumentation cylinder increases due to the jetted high-pressure water, and a neutron flux detector is further pressed by the water pressure. Accordingly, a problem arises in that the thimble tube moves so as to be popped out to a storage chamber.

The invention is made to solve the above-described problems, and an object thereof is to provide a water jet peening apparatus and a water jet peening method capable of improving the safety of an operation by preventing a thimble tube from being popped out due to a water jet peening operation.

Solution to Problem

According to an aspect of the present invention, a water jet peening apparatus includes: a clamping cylinder which is able to be disposed at the outer peripheral side of an instrumentation nozzle with a predetermined gap therebetween; a clamping mechanism which is able to fix the clamping cylinder to the instrumentation nozzle; a positioning member that has a cylindrical shape, is provided inside the clamping cylinder, and is positioned to a position adjacent to the upper end of the instrumentation nozzle; an inner surface WJP nozzle which is movable upward and downward inside the positioning member; and a drainage hole which radially penetrates the positioning member.

Accordingly, the positioning member is provided at a position adjacent to the upper end of the instrumentation nozzle inside the clamping cylinder, and the drainage hole is provided so as to radially penetrate the positioning member. Accordingly, when the high-pressure water including cavitation air bubbles is jetted from the inner surface WJP nozzle to the inner surface of the instrumentation nozzle under water, the residual tensile stress of the inner surface of the instrumentation nozzle is solved by the residual compressive stress, and the jetted high-pressure water is discharged from the drainage hole of the positioning member while not substantially giving any action on the neutron flux detector. Accordingly, it is possible to improve the safety of the operation by preventing the thimble tube from being popped out due to the water jet peening operation.

Advantageously, in the water jet peening apparatus, the positioning member includes a cylindrical portion and a flange portion provided at the lower end of the cylindrical portion, and a plurality of the drainage holes is provided in the flange portion at the same interval in the circumferential direction.

Accordingly, since the plurality of drainage holes is provided in the flange portion of the positioning member at the same interval in the circumferential direction, the high-pressure water which is jetted from the inner surface WJP nozzle is highly efficiently discharged from the plurality of drainage holes, and hence the draining performance may be improved.

Advantageously, in the water jet peening apparatus, the positioning member is positioned to a position contacting the upper end of the instrumentation nozzle.

Accordingly, since the positioning member is positioned to a position contacting the upper end of the instrumentation nozzle, the positioning member and the instrumentation nozzle are disposed without any gap therebetween, and hence the high-pressure water which is jetted from the inner surface WJP nozzle may be appropriately led to the plurality of drainage holes.

Advantageously, in the water jet peening apparatus, a detection device is provided which detects a state where the positioning member is positioned to a predetermined position of the instrumentation nozzle.

Accordingly, since the detection device detects a state where the positioning member is positioned to a predetermined position of the instrumentation nozzle, the water jet peening apparatus may be highly precisely positioned to the instrumentation nozzle.

Advantageously, in the water jet peening apparatus, the detection device includes a detection rod which is supported by the clamping cylinder so as to be movable upward and downward and of which the lower end directly or indirectly is able to contact the upper end of the instrumentation nozzle and a detector which detects the up and down position of the detection rod.

Accordingly, when the lower end of the detection rod supported by the clamping cylinder so as to be movable upward and downward directly or indirectly contacts the upper end of the instrumentation nozzle, the detector detects the position of the detection rod, and hence the water jet peening apparatus may be highly precisely positioned to the instrumentation nozzle with a simple configuration.

Advantageously, in the water jet peening apparatus, the positioning member includes an operation piece which is supported by the clamping cylinder so as to be movable upward and downward and able to come into surface-contact with the upper end surface of the instrumentation nozzle, and the detection rod is movable upward and downward through the operation piece.

Accordingly, when the operation piece of the positioning member comes into surface-contact with the upper end surface of the instrumentation nozzle, the detection rod moves, and the movement of the positioning member to a predetermined position is highly precisely detected. Accordingly, the water jet peening apparatus may be highly precisely positioned to the instrumentation nozzle.

Advantageously, in the water jet peening apparatus, the detection rod is disposed outside the positioning member.

Accordingly, the inner surface WJP nozzle moves upward and downward inside the positioning member, and the detection rod is disposed outside the positioning member. Accordingly, the detection rod does not disturb the upward and downward movement of the inner surface WJP nozzle, and hence the stable water jet peening operation may be performed.

Advantageously, in the water jet peening apparatus, one end of a conduit tube is connected to the instrumentation nozzle, and the other end thereof extends to a monitoring chamber so as to be connected thereto and a thimble tube having a neutron flux detector attached to the front end thereof is inserted from the other end of the conduit tube, and is insertable into a nuclear reactor vessel through the instrumentation nozzle, and a fixing device is provided which does not allow the end of the thimble tube drawn from the other end of the conduit tube to be movable with respect to the conduit tube.

Accordingly, since the fixing device immovably fixes the thimble tube drawn from the other end of the conduit tube, it is possible to prevent the thimble tube from being popped out due to the water jet peening operation.

Advantageously, in the water jet peening apparatus, the fixing device includes a first fixing jig which is fixed to the conduit tube extending to the monitoring chamber, a second fixing jig which is fixed to the end of the thimble tube drawn from the other end of the conduit tube, and a connection member which suppresses the separation of the first fixing jig and the second fixing jig.

Accordingly, it is possible to easily prevent the thimble tube from being popped out due to the water jet peening operation with a simple configuration.

Advantageously, in the water jet peening apparatus, a monitoring device is provided which monitors the fixed state of the thimble tube and the conduit tube.

Accordingly, since the fixed state of the thimble tube and the conduit tube is monitored by the monitoring device, it is possible to prevent the thimble tube from being popped out due to the water jet peening operation.

According to another aspect of the present invention, a water jet peening method includes: disposing a clamping cylinder at the outer peripheral side of an instrumentation nozzle with a predetermined gap therebetween; fixing a positioning member provided in the clamping cylinder to the instrumentation nozzle at a position adjacent to the upper end of the instrumentation nozzle; moving an inner surface WJP nozzle downward to the instrumentation nozzle through the clamping cylinder; jetting high-pressure water to an inner surface of the instrumentation nozzle by moving the inner surface WJP nozzle downward in a rotation state while the high-pressure water including cavitation air bubbles is jetted from the inner surface WJP nozzle; and discharging the high-pressure water jetted from the inner surface WJP nozzle to the outside from a drainage hole provided in the positioning member.

Accordingly, when the high-pressure water including cavitation air bubbles is jetted from the inner surface WJP nozzle to the inner surface of the instrumentation nozzle under water, the residual tensile stress of the inner surface of the instrumentation nozzle is solved by the residual compressive stress, and the jetted high-pressure water is discharged from the drainage hole of the positioning member while not substantially giving any action on the neutron flux detector. Accordingly, it is possible to improve the safety of the operation by preventing the thimble tube from being popped out due to the water jet peening operation.

Advantageously, in the water jet peening method, the high-pressure water is jetted from the inner surface WJP nozzle while a thimble tube drawn to the outside from the instrumentation nozzle through a conduit tube is not movable.

Accordingly, it is possible to prevent the thimble tube from being popped out due to the water jet peening operation.

Advantageously, in the water jet peening apparatus, the fixed state of the thimble tube and the conduit tube is monitored when the high-pressure water is jetted from the inner surface WJP nozzle to the inner surface of the instrumentation nozzle.

Accordingly, it is possible to prevent the thimble tube from being popped out due to the water jet peening operation.

Advantageous Effects of Invention

According to the water jet peening apparatus and the water jet peening method of the invention, the positioning member is provided so as to be positioned to a position adjacent to the upper end of the instrumentation nozzle inside the clamping cylinder and the drainage hole is provided so as to radially penetrate the positioning member. Thus, it is possible to improve the safety of the operation by preventing the thimble tube from being popped out due to the water jet peening operation.

DESCRIPTION OF EMBODIMENTS

Hereinafter, preferred embodiments of a water jet peening apparatus and a water jet peening method according to the invention will be described in detail with reference to the accompanying drawings. Furthermore, the invention is not limited to the embodiment. Further, when a plurality of embodiments is provided, the embodiments may be combined with one another.

First Embodiment

Figure 11:
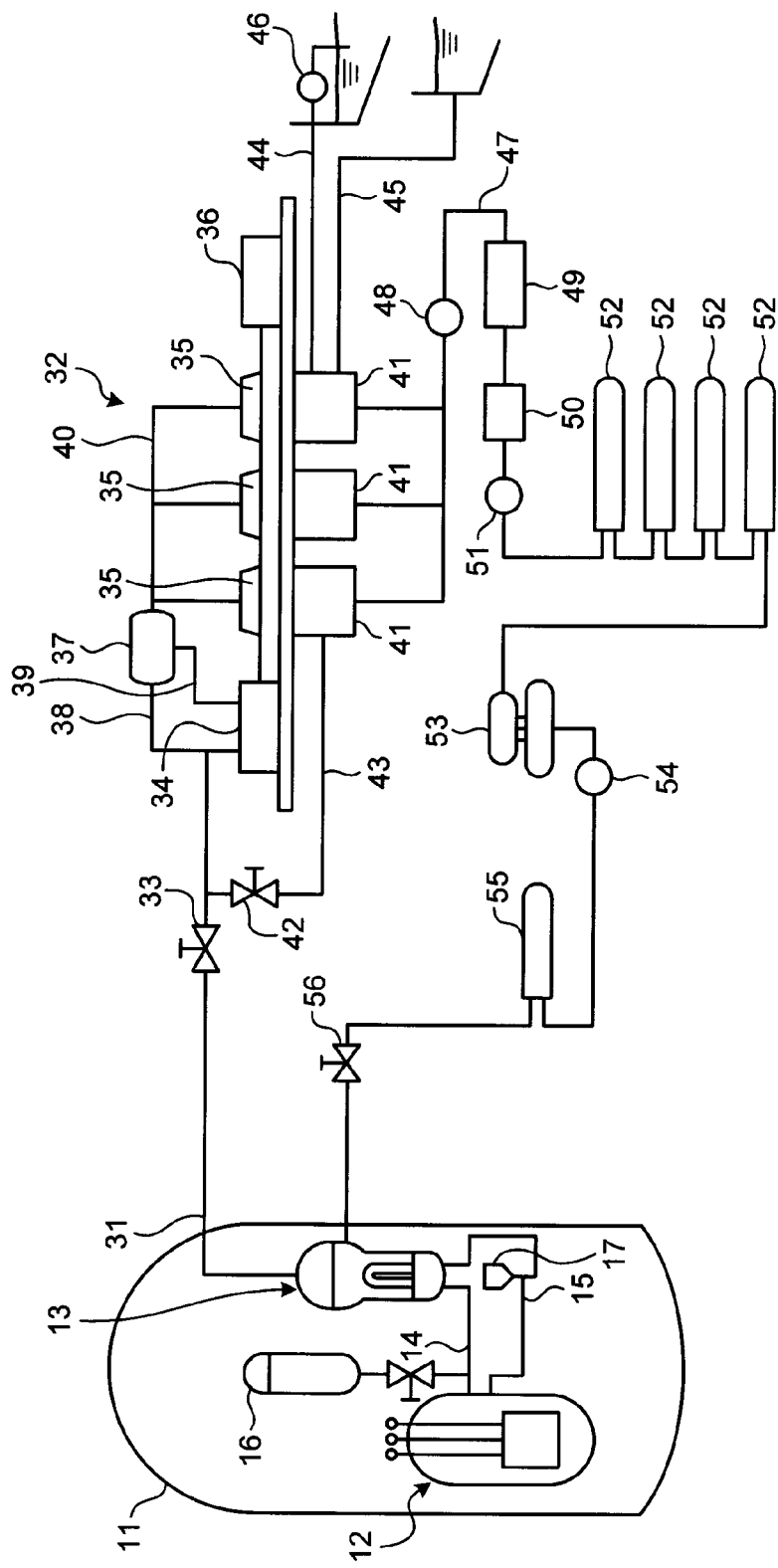
FIG. 11 is a schematic configuration diagram of a nuclear power plant.
Figure 12:
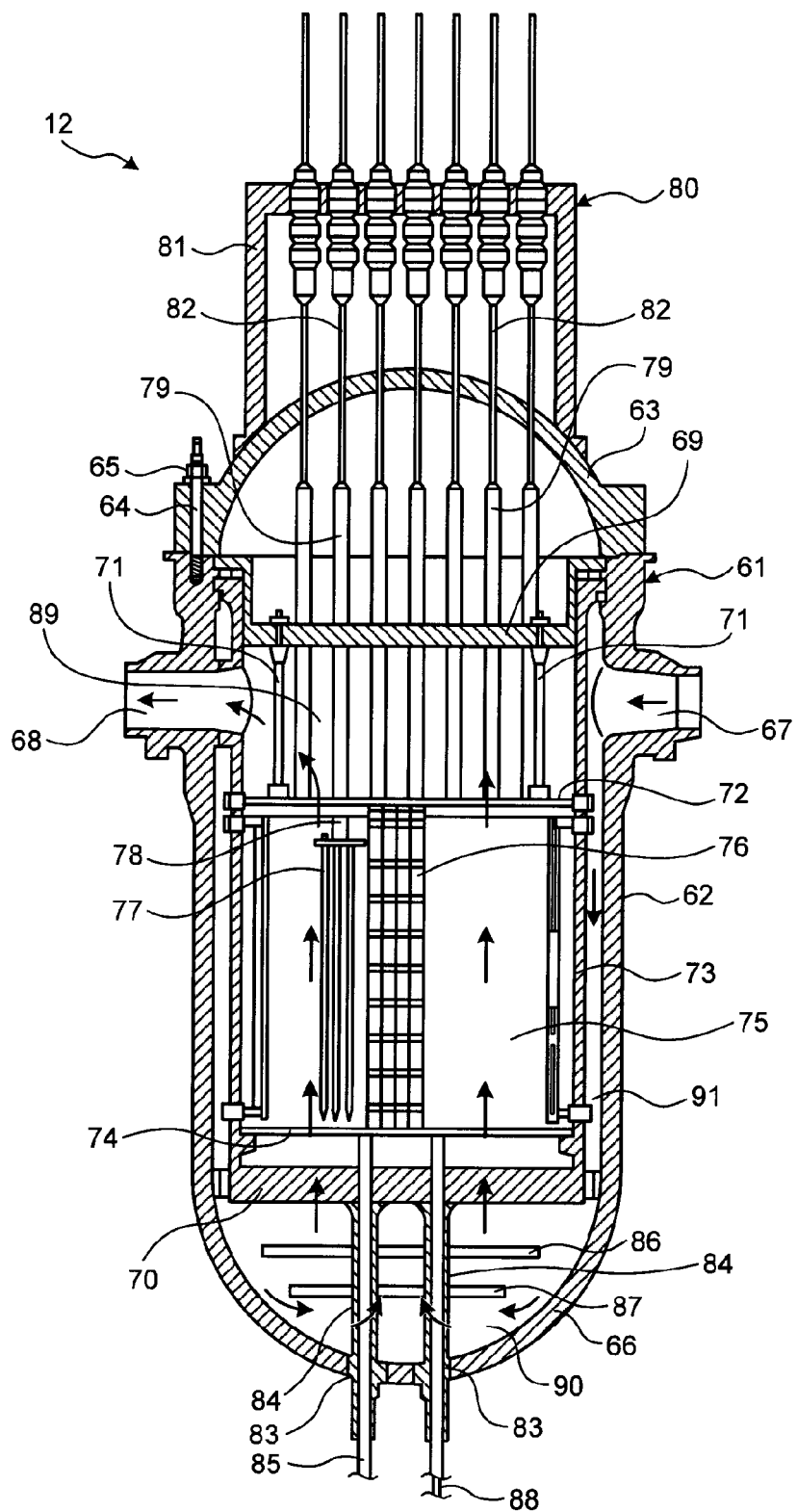
FIG. 12 is a longitudinal sectional view illustrating a pressurized water reactor.
Figure 13:
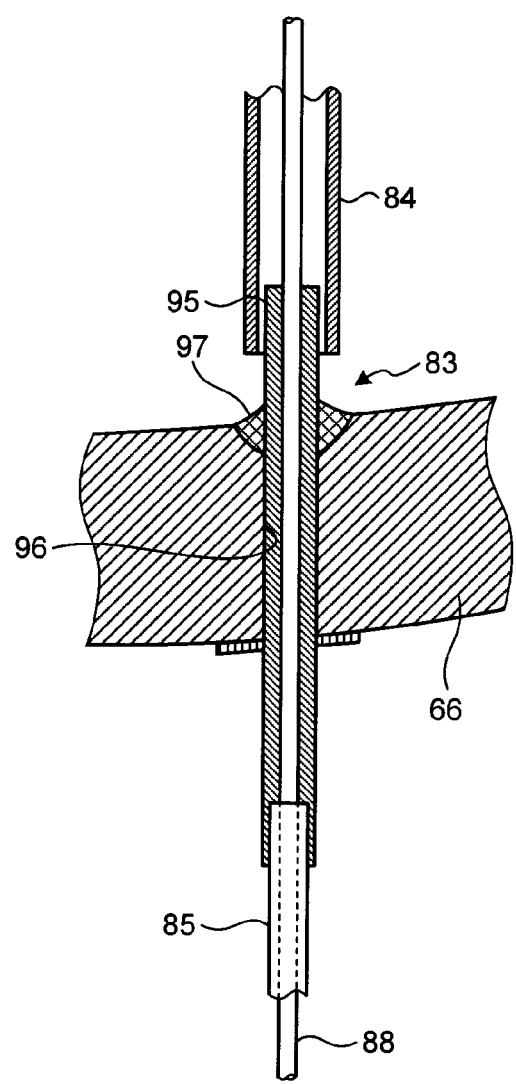
FIG. 13 is a cross-sectional view illustrating an instrumentation nozzle of a nuclear reactor vessel.

FIG. 11 is a schematic configuration diagram of a nuclear power plant, FIG. 12 is a longitudinal sectional view illustrating a pressurized water reactor, and FIG. 13 is a cross-sectional view illustrating an instrumentation nozzle of a nuclear reactor vessel.

A nuclear reactor of the first embodiment is a pressurized water reactor that uses light water as a nuclear reactor coolant and a neutron moderator while keeping the light water as high-temperature and high-pressure water which is not boiled throughout a reactor core, sends the high-temperature and high-pressure water to a steam generator so as to generate a steam by a heat exchange operation, and sends the steam to a turbine generator so as to generate electric power.

In a nuclear power plant that includes the pressurized water reactor of the first embodiment, as illustrated in FIG. 11, a containment 11 accommodates a pressurized water reactor 12 and a steam generator 13 therein. Here, the pressurized water reactor 12 and the steam generator 13 are connected to a high-temperature-side supply pipe 14 through a low-temperature-side supply pipe 15, the high-temperature-side supply pipe 14 is provided with a pressurizer 16, and the low-temperature-side supply pipe 15 is provided with a primary cooling water pump 17. In this case, light water is used as a moderator and primary cooling water (coolant), and a primary cooling system is controlled at a high-pressure state of about 150 to 160 atm by the pressurizer 16 in order to prevent the primary cooling water from being boiled in the reactor core.

Accordingly, in the pressurized water reactor 12, the light water as the primary cooling water is heated by low-enriched uranium or MOX as a fuel (an atomic fuel), and the high-temperature primary cooling water is sent to the steam generator 13 through the high-temperature-side supply pipe 14 while being maintained at a predetermined high pressure by the pressurizer 16. In the steam generator 13, the primary cooling water which is cooled by a heat exchange operation between the high-temperature and high-pressure primary cooling water and the secondary cooling water is returned to the pressurized water reactor 12 through the low-temperature-side supply pipe 15.

The steam generator 13 is connected to a steam turbine 32 through a pipe 31 that supplies the heated secondary cooling water, that is, steam, and the pipe 31 is provided with a main steam isolation valve 33. The steam turbine 32 includes a high-pressure turbine 34 and a low-pressure turbine 35, and is connected to a generator (a generation device) 36. Further, a moisture separation heater 37 is provided between the high-pressure turbine 34 and the low-pressure turbine 35. Here, a cooling water branch pipe 38 which is branched from the pipe 31 is connected to the moisture separation heater 37, the high-pressure turbine 34 and the moisture separation heater 37 are connected to each other by a low-temperature reheating pipe 39, and the moisture separation heater 37 and the low-pressure turbine 35 are connected to each other by a high-temperature reheating pipe 40.

Further, the low-pressure turbine 35 of the steam turbine 32 includes a condenser 41. Here, the condenser 41 is connected to a turbine bypass pipe 43 which extends from the pipe 31 and includes a bypass valve 42, and is connected to a water intake pipe 44 and a drainage pipe 45 which supply and discharge the cooling water (for example, sea water). The water intake pipe 44 includes a circulation water pump 46, and the other end thereof is disposed under the sea along with the drainage pipe 45.

Then, the condenser 41 is connected to a pipe 47, a condensate pump 48, a grand condenser 49, a condensed water desalting device 50, a condensate booster pump 51, and a low-pressure feed water heater 52. Further, the pipe 47 is connected to a deaerator 53, and is provided with a water feeding pump 54, a high-pressure feed water heater 55, and a water feeding control valve 56.

Accordingly, in the steam generator 13, the steam which is generated by the heat exchange operation with respect to the high-pressure and high-temperature primary cooling water is sent to the steam turbine 32 (from the high-pressure turbine 34 to the low-pressure turbine 35) through the pipe 31. Then, the steam turbine 32 is driven by the steam so that the generator 36 generates electric power. At this time, the steam which is sent from the steam generator 13 is used to drive the high-pressure turbine 34, passes through the moisture separation heater 37 so that the steam is heated while a moisture contained in the steam is removed, and is used to drive the low-pressure turbine 35. Then, the steam having been used to drive the steam turbine 32 is cooled into condensed water by the sea water in the condenser 41, and is returned to the steam generator 13 through the grand condenser 49, the condensed water desalting device 50, the low-pressure feed water heater 52, the deaerator 53, the high-pressure feed water heater 55, and the like.

In the pressurized water reactor 12 of the nuclear power plant with such a configuration, as illustrated in FIG. 12, a nuclear reactor vessel 61 includes a nuclear reactor vessel body 62 and a nuclear reactor vessel head (an upper end plate) 63 attached to the upper portion thereof so that an in-core structure is inserted thereinto, and the nuclear reactor vessel head 63 is fixed to the nuclear reactor vessel body 62 by a plurality of stud bolts 64 and a plurality of nuts 65 so as to be opened and closed.

The nuclear reactor vessel body 62 has a cylindrical shape of which the upper portion can be opened by the separation of the nuclear reactor vessel head 63 and the lower portion is formed in a semi-spherical shape while being closed by a lower end plate 66. Then, the upper portion of the nuclear reactor vessel body 62 is provided with an inlet nozzle (an entrance nozzle) 67 which supplies the light water (coolant) as the primary cooling water and an outlet nozzle (an exist nozzle) 68 which discharges the light water. Further, the nuclear reactor vessel body 62 is provided with a water injection nozzle (a water injection nozzle) (not illustrated) separately from the inlet nozzle 67 and the outlet nozzle 68.

In the inside of the nuclear reactor vessel body 62, an upper core support plate 69 is fixed to a portion above the inlet nozzle 67 and the outlet nozzle 68 and a lower core support plate 70 is fixed so as to be located in the vicinity of the lower end plate 66. The upper core support plate 69 and the lower core support plate 70 are formed in a disk shape and are provided with a plurality of flow holes (not illustrated). Then, the upper core support plate 69 is connected to an upper core plate 72 provided with a plurality of flow holes (not illustrated) below through a plurality of reactor core support rods 71.

A core barrel 73 which has a cylindrical shape is disposed inside the nuclear reactor vessel body 62 with a predetermined gap with respect to the inner wall surface. Further, the upper portion of the core barrel 73 is connected to the upper core plate 72, and the lower portion thereof is connected to a lower core plate 74 having a disk shape and a plurality of flow holes (not illustrated) formed therein. Then, the lower core plate 74 is supported by the lower core support plate 70. That is, the core barrel 73 is supported in a suspended state on the lower core support plate 70 of the nuclear reactor vessel body 62.

A reactor core 75 is formed by the upper core plate 72, the core barrel 73, and the lower core plate 74, and the reactor core 75 has a plurality of fuel assemblies 76 disposed therein. Although not illustrated in the drawings, each of the fuel assemblies 76 is formed by binding a plurality of fuel rods in a grid shape by a support grid. Here, the upper nozzle is fixed to the upper end, and the lower nozzle is fixed to the lower end. Further, the reactor core 75 has a plurality of control rods 77 disposed therein. The plurality of control rods 77 is formed as a control rod cluster 78 while the upper ends are evenly arranged, and is insertable into the fuel assembly 76. In the upper core support plate 69, a plurality of control rod cluster guide pipes 79 is fixed while penetrating the upper core support plate 69, and each control rod cluster guide pipe 79 is formed so that the lower end thereof extends to the control rod cluster 78 inside the fuel assembly 76.

The upper portion of the nuclear reactor vessel head 63 that constitutes the nuclear reactor vessel 61 is formed in a semi-spherical shape, and a magnetic jack type control rod driving mechanism 80 is accommodated in a housing 81 which is integrated with the nuclear reactor vessel head 63. The plurality of control rod cluster guide pipes 79 is formed so that the upper ends thereof extend to the control rod driving mechanism 80, and control rod cluster driving shafts 82 which extend from the control rod driving mechanism 80 extend to the fuel assemblies 76 while passing through the inside of the control rod cluster guide pipes 79, thereby gripping the control rod cluster 78.

The control rod driving mechanism 80 extends in the vertical direction so as to be connected to the control rod cluster 78, and a control rod cluster driving shaft 82 of which the surface is provided with a plurality of circumferential grooves formed equally pitched in the longitudinal direction is moved in the vertical direction by the magnetic jack, thereby controlling the output of the nuclear reactor.

Further, the nuclear reactor vessel body 62 is provided with a plurality of instrumentation nozzles 83 which penetrates the lower end plate 66, and each of the instrumentation nozzles 83 is formed so that the upper end inside the reactor is connected to an in-core instrumentation guide pipe 84 and the lower end outside the reactor is connected to a conduit tube 85. In each of the in-core instrumentation guide pipes 84, the upper end is connected to the lower core support plate 70 and upper and lower connection plates 86 and 87 for suppressing a vibration are connected to the in-core instrumentation guide pipes. A thimble tube 88 is provided with a neutron flux detector (not illustrated) capable of measuring a neutron flux, and is insertable to the fuel assembly 76 while penetrating the lower core plate 74 from the conduit tube 85 along the instrumentation nozzle 83 and the in-core instrumentation guide pipe 84.

Accordingly, the nuclear fission inside the reactor core 75 is controlled in a manner such that the control rod cluster driving shaft 82 is moved by the control rod driving mechanism 80 so as to extract the control rod 77 from the fuel assembly 76 by a predetermined amount. Then, the light water charged into the nuclear reactor vessel 61 is heated by the generated thermal energy, and the high-temperature light water is discharged from the outlet nozzle 68 so as to be sent to the steam generator 13 as described above. That is, neutrons are discharged by the nuclear fission of the atomic fuel forming the fuel assembly 76, and the light water as the moderator and the primary cooling water decreases the movement energy of the discharged high-speed neutrons so as to form thermal neutrons. Accordingly, new nuclear fission may easily occur, and the generated heat is removed and cooled. Meanwhile, when the control rod 77 is inserted into the fuel assembly 76, the number of neutrons generated inside the reactor core 75 may be adjusted. Further, when the entire control rod 77 is inserted into the fuel assembly 76, the nuclear reactor may be emergently stopped.

Further, the nuclear reactor vessel 61 is formed so that an upper plenum 89 communicating with the outlet nozzle 68 is provided above the reactor core 75 and a lower plenum 90 is provided therebelow. Then, a down corner portion 91 which communicates with the inlet nozzle 67 and the lower plenum 90 is formed between the nuclear reactor vessel 61 and the core barrel 73. Accordingly, the light water flows from the inlet nozzle 67 into the nuclear reactor vessel body 62, flows downward to the down corner portion 91, reaches the lower plenum 90, rises while being guided upward by the spherical inner surface of the lower plenum 90, passes through the lower core support plate 70 and the lower core plate 74, and flows into the reactor core 75. The light water which flows into the reactor core 75 increases in temperature while cooling the fuel assembly 76 by absorbing the thermal energy generated from the fuel assembly 76 constituting the reactor core 75, passes through the upper core plate 72, rises to the upper plenum 89, and is discharged through the outlet nozzle 68.

In the nuclear reactor vessel 61 with such a configuration, as illustrated in FIG. 13, the instrumentation nozzle 83 is formed in a manner such that an in-core instrumentation cylinder 95 is fitted into an attachment hole 96 formed in the lower end plate 66 of the nuclear reactor vessel body 62 and the upper end of the in-core instrumentation cylinder 95 is fixed to the inner surface (a groove-welding portion 97) of the lower end plate 66 by welding. The nuclear reactor vessel body 62 is formed by buttered-welding stainless steel to the inner surface of low-alloy steel, and the in-core instrumentation cylinder 95 of nickel alloy is welded to the nuclear reactor vessel body 62 by nickel alloy (as the groove-welding portion 97) while being fitted into the attachment hole 96 of the nuclear reactor vessel body 62.

For that reason, there is a possibility that a tensile stress may remain in the in-core instrumentation cylinder 95, the groove-welding portion 97, and the vicinity thereof. Thus, there is an increase in the possibility of stress corrosion cracking due to the long-term use. Here, the stress corrosion cracking is prevented by solving the residual tensile stress of the surface using the residual compressive stress through a water jet peening (WJP) apparatus as a nuclear reactor repairing apparatus. The water jet peening apparatus is used to solve the residual tensile stress of the surface of the metal member by the residual compressive stress by jetting high-pressure water including cavitation air bubbles to the surface of the metal member under the water.

Then, in a case where the residual tensile stress of the surface of the lower end plate 66 is solved by the residual compressive stress through the water jet peening apparatus, the water jet peening operation is performed while the water jet peening apparatus is attached to the instrumentation nozzle 83 (the in-core instrumentation cylinder 95).

Figure 1:
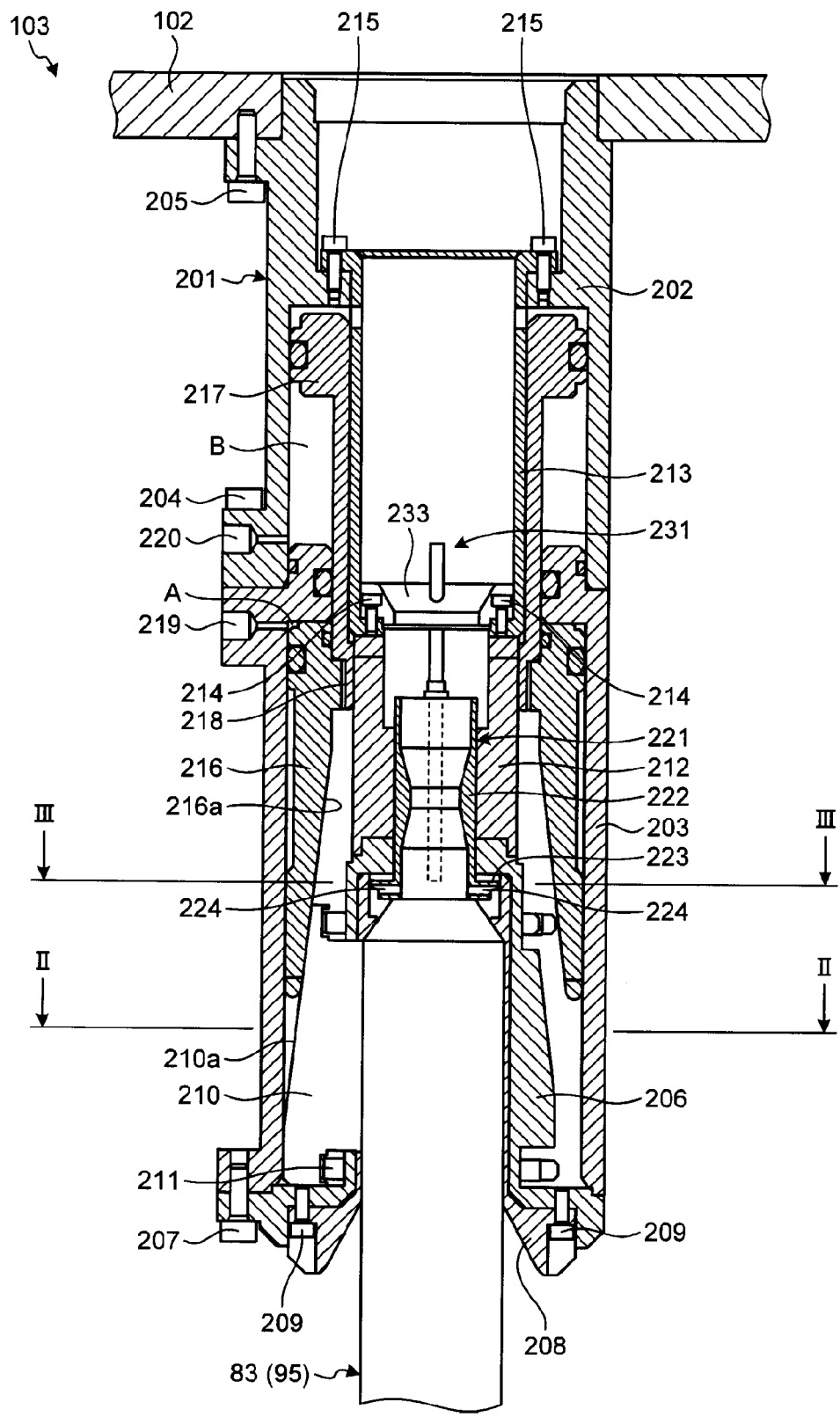
FIG. 1 is a longitudinal sectional view illustrating a clamping device of a water jet peening apparatus according to a first embodiment of the invention.
Figure 2:
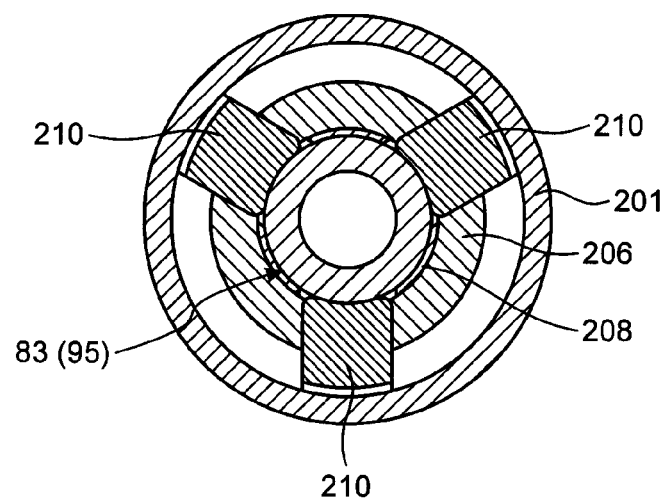
FIG. 2 is a cross-sectional view taken along the line II-II of FIG. 1.
Figure 3:
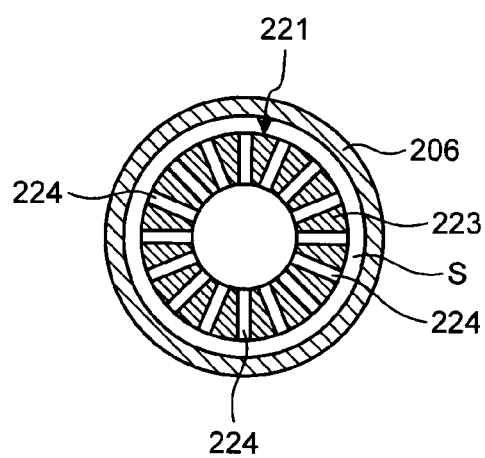
FIG. 3 is a cross-sectional view taken along the line III-III of FIG. 1.
Figure 4:
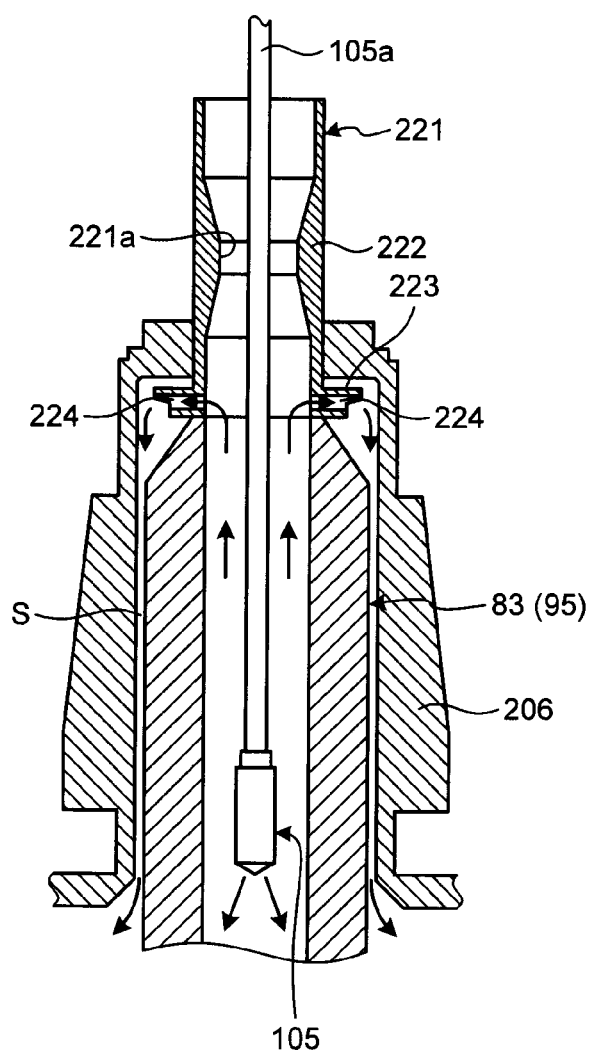
FIG. 4 is a schematic diagram illustrating a water jet peening action for an inner surface.
Figure 5:
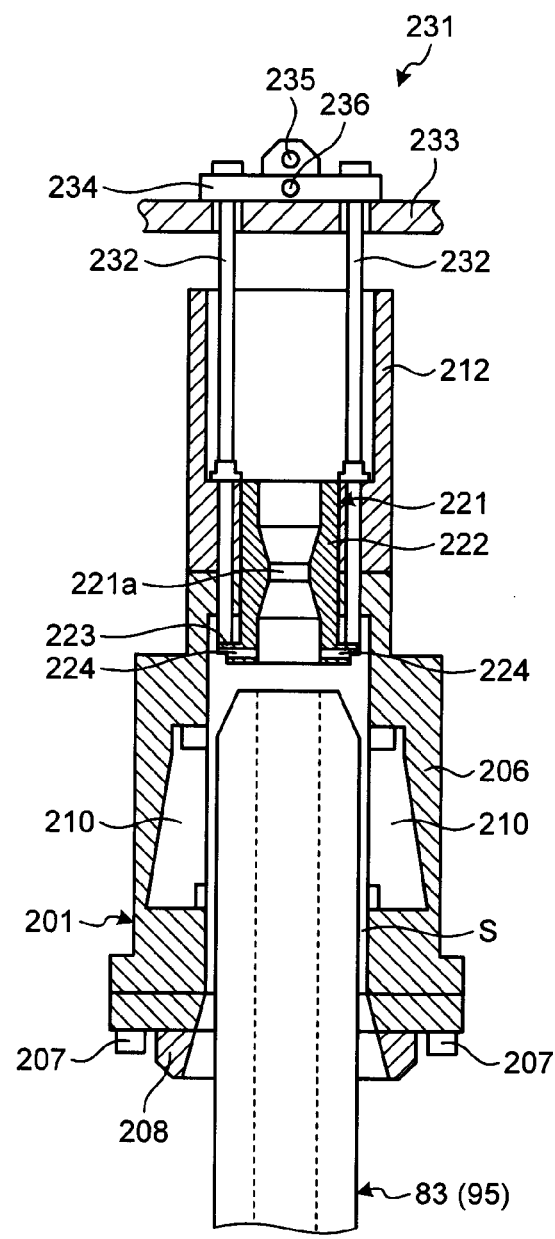
FIG. 5 is a schematic diagram illustrating a detection device of the water jet peening apparatus.
Figure 6:
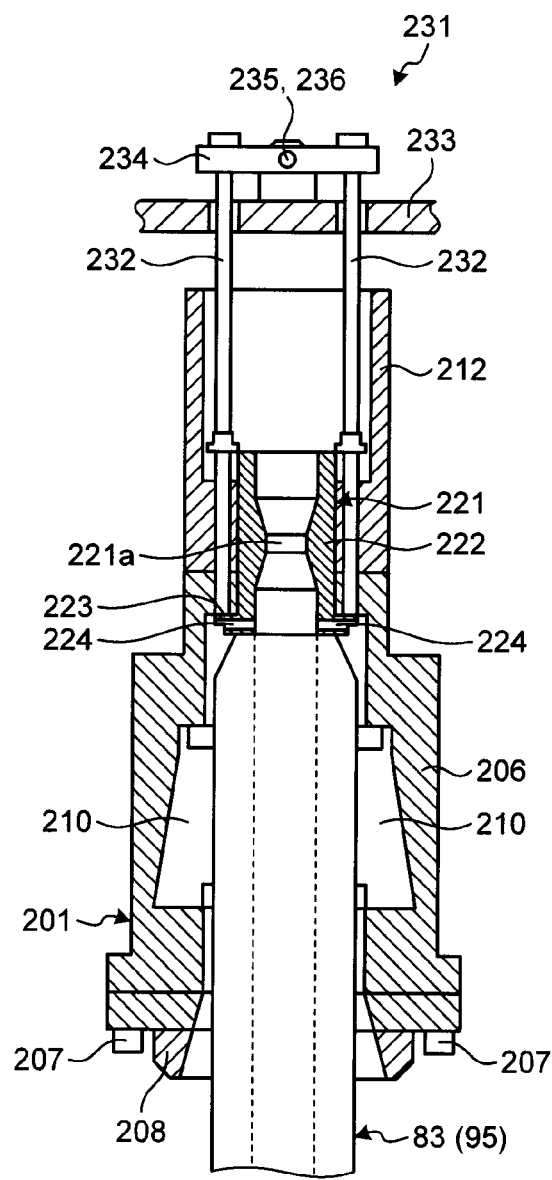
FIG. 6 is a schematic diagram illustrating an action of the detection device.
Figure 7:
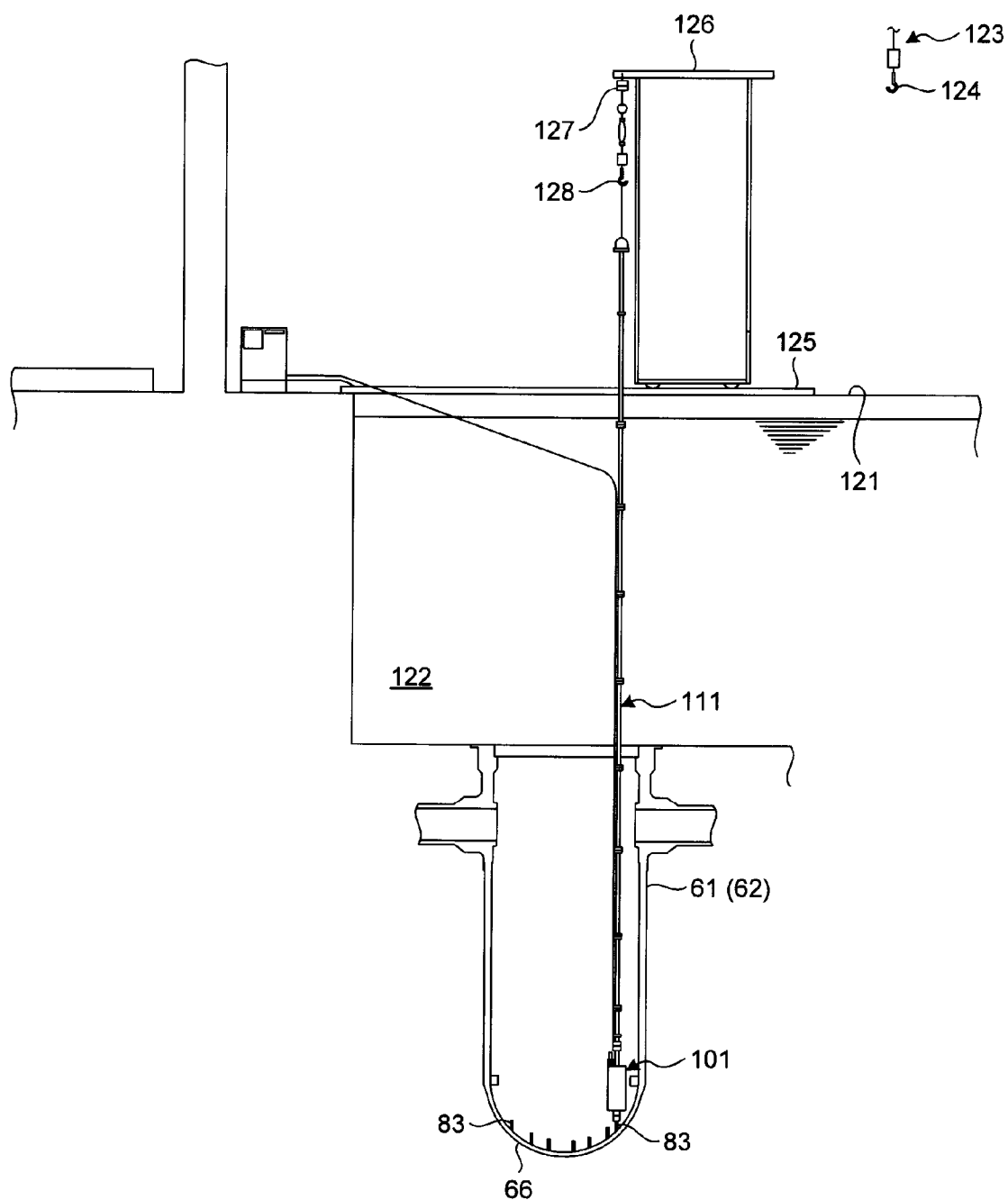
FIG. 7 is a schematic diagram illustrating a state where the water jet peening apparatus is provided.
Figure 8:
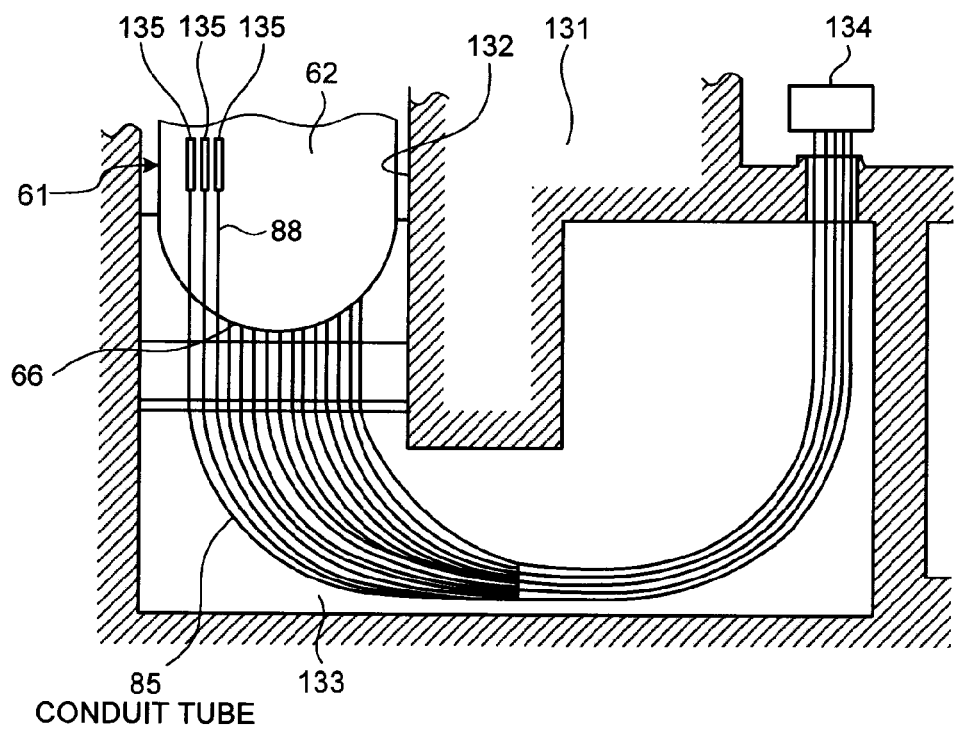
FIG. 8 is a schematic diagram illustrating a lower portion of a nuclear reactor vessel.
Figure 9:
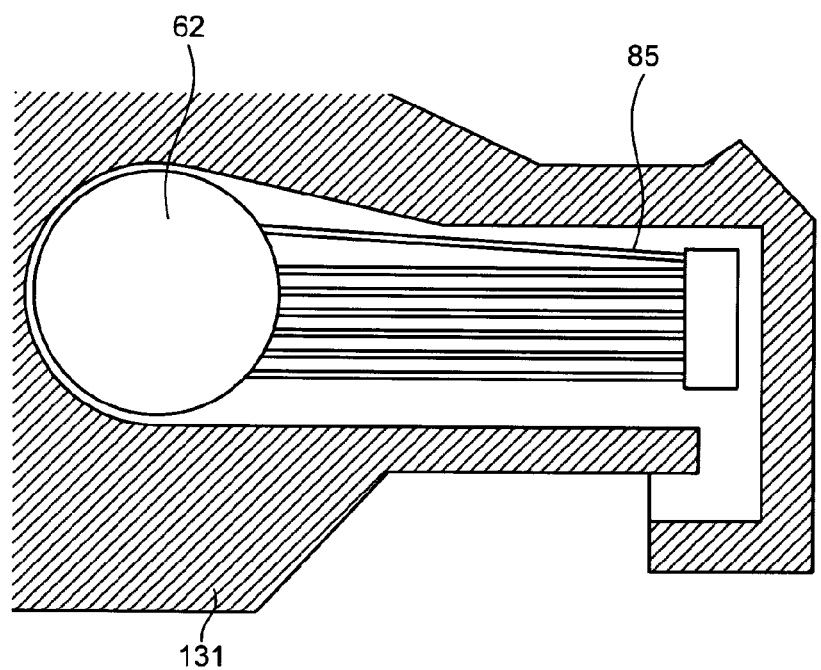
FIG. 9 is a top view illustrating the lower portion of the nuclear reactor vessel.
Figure 10:
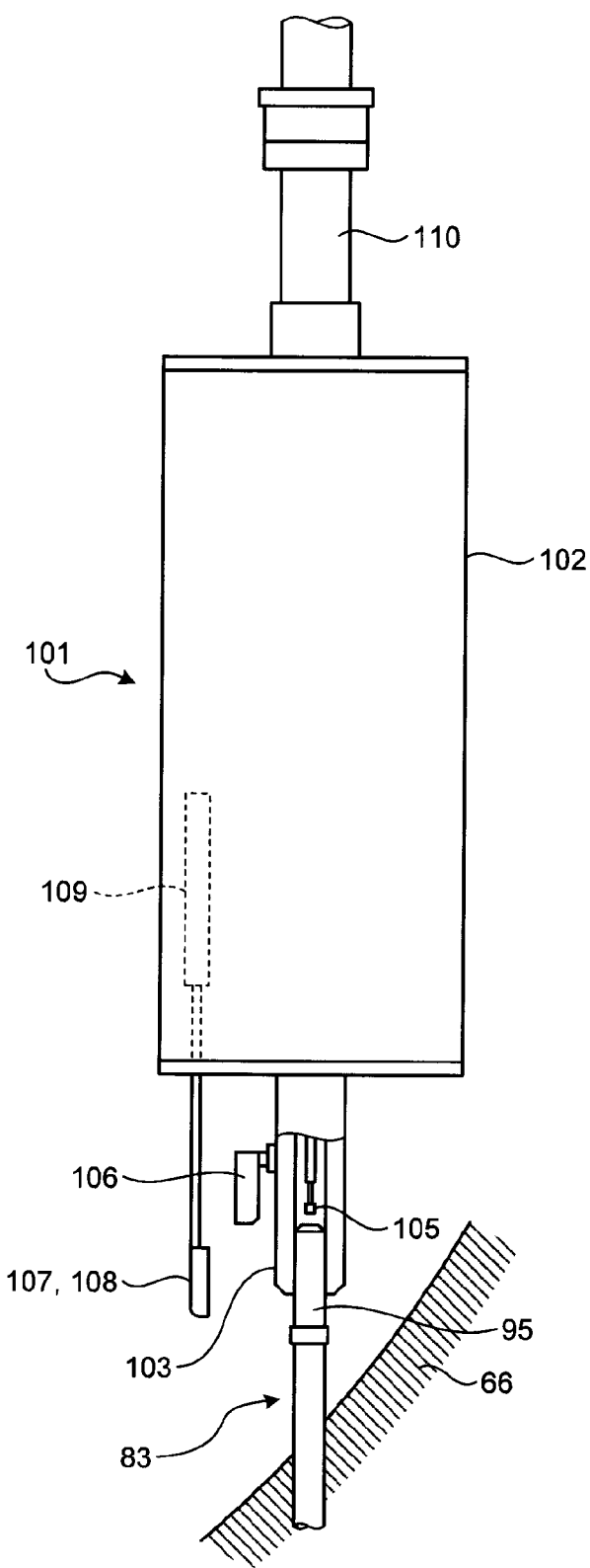
FIG. 10 is a front view illustrating the water jet peening apparatus.

FIG. 1 is a longitudinal sectional view illustrating a clamping device of the water jet peening apparatus according to the first embodiment of the invention, FIG. 2 is a cross-sectional view taken along the line II-II of FIG. 1, FIG. 3 is a cross-sectional view taken along the line III-III of FIG. 1, FIG. 4 is a schematic diagram illustrating a water jet peening action for an inner surface, FIG. 5 is a schematic diagram illustrating a detection device of the water jet peening apparatus, FIG. 6 is a schematic diagram illustrating an action of the detection device, FIG. 7 is a schematic diagram illustrating a state where the water jet peening apparatus is provided, FIG. 8 is a schematic diagram illustrating a lower portion of a nuclear reactor vessel, FIG. 9 is a top view illustrating the lower portion of the nuclear reactor vessel, and FIG. 10 is a front view illustrating the water jet peening apparatus.

In the first embodiment, as illustrated in FIG. 7, a water jet peening apparatus 101 is fixed to the instrumentation nozzle 83 (the in-core instrumentation cylinder 95) provided in the lower end plate (the semi-spherical portion) 66 of the nuclear reactor vessel 61 (the nuclear reactor vessel body 62). That is, in the nuclear power plant, a nuclear reactor building (not illustrated) is provided with a working floor 121, a cavity 122 is provided below the working floor 121, and cooling water is stored in the cavity 122. The nuclear reactor vessel 61 is disposed inside the cavity 122 while being supported in a suspended state.

The nuclear reactor building is provided with an overhead traveling crane 123, and a hook 124 is movable and movable upward and downward in two directions intersecting the horizontal direction. Further, a pair of guide rails 125 is laid at both sides of the cavity 122 in the nuclear reactor building, and a movement crane 126 is supported so as to be movable. The movement crane 126 is provided with an electric hoist 127 which is movable in one direction (in FIG. 7, the left and right direction) of the horizontal direction and the other direction (in FIG. 7, the up and down direction perpendicular to the drawing paper) intersection (perpendicular to) one direction of the horizontal direction. Then, the electric hoist 127 includes a hook 128 which is movable upward and downward in the vertical direction.

An installation pole 111 is an elongated member, and has a predetermined length. Here, the water jet peening apparatus 101 is connectable to the lower end thereof. The installation pole 111 includes a plurality of divided poles, and the divided poles may be coupled to each other while the flange portions are coupled to each other by a plurality of swing bolts in a close contact state. Further, in the embodiment, the installation pole 111 is used as the installation jig of the water jet peening apparatus 101, but the invention is not limited to this configuration. For example, a wire, a cable, or a rope may be used.

Further, as illustrated in FIGS. 8 and 9, the nuclear reactor vessel 61 is supported by a concrete structure 131 provided on a firm ground such as a solid rock. The nuclear reactor vessel 61 is disposed in a cylindrical portion 132 provided in the concrete structure 131, and is supported in a suspended state. Then, the concrete structure 131 is located at the lower portion of the nuclear reactor vessel 61 and is provided with a thimble tube piping chamber 133. The plurality of conduit tubes 85 is curved so as to be drawn around the thimble tube piping chamber 133 while one ends are connected to the instrumentation nozzle 83 of the lower end plate 66 and the other ends are disposed in a monitoring chamber 134 in a collected state.

A neutron flux detector 135 is attached to the front end of the thimble tube 88, is inserted from the other end of the conduit tube 85, and is disposed inside the nuclear reactor vessel 61 during the operation of the nuclear reactor. Then, the neutron flux detector 135 is extracted from the nuclear reactor vessel 61 through the thimble tube 88 during the water jet peening operation.

As illustrated in FIG. 10, the water jet peening apparatus 101 includes an apparatus body 102, a clamping device 103, and an inner surface WJP nozzle 105. The clamping device 103 is disposed so as to protrude downward from the lower portion of the apparatus body 102, and is fitted and clamped to the outer peripheral surface of the instrumentation nozzle 83 (the in-core instrumentation cylinder 95) so that the apparatus body 102 is fixed to the instrumentation nozzle 83. The inner surface WJP nozzle 105 is used to jet high-pressure tensile water to the inner surface of the in-core instrumentation cylinder 95.

In this case, the inner surface WJP nozzle 105 is movable upward and downward by an elevation mechanism (not illustrated) provided in the apparatus body 102, and is rotatable by a rotation mechanism (not illustrated). Accordingly, high-pressure water may be jetted to a predetermined area of the lower end plate 66, the groove-welding portion 97, and the in-core instrumentation cylinder 95.

Further, the water jet peening apparatus 101 has a configuration in which the apparatus body 102 is provided with an operation monitoring camera 106 and apparatus positioning cameras 107 and 108. The operation monitoring camera 106 is fixed to the apparatus body 102, and is rotatable about the horizontal support shaft. Accordingly, the imaging direction may be changed.

The apparatus positioning cameras 107 and 108 are separated from each other by a predetermined angle θ (for example, 90°) in the horizontal direction, and include illumination lamps. The apparatus positioning cameras 107 and 108 are movable upward and downward by an elevation cylinder 109 with respect to the apparatus body 102. Here, the apparatus positioning cameras are movable to the downward movement position during the positioning operation of the water jet peening apparatus 101, and are movable to the upward movement position during the water jet peening operation of the water jet peening apparatus 101.

In the water jet peening apparatus 101, a connection shaft 110 is fixed to the upper portion of the apparatus body 102 and is connectable to the installation pole 111.

In the clamping device 103 of the water jet peening apparatus 101, as illustrated in FIGS. 1 to 3, a clamping cylinder 201 has a cylindrical shape in which an upper clamping cylinder 202 and a lower clamping cylinder 203 are coupled to each other by a bolt 204, and is fixed to the apparatus body 102 by a bolt 205.

A support cylinder 206 is disposed at the lower portion inside the clamping cylinder 201, and the lower end thereof is fixed to the lower end of the clamping cylinder 201 by a bolt 207. Further, a guide cylinder 208 is fitted into the support cylinder 206, and the lower end thereof is fixed to the lower end of the support cylinder 206 by a bolt 209. A plurality of (in the embodiment, three) clamping pieces 210 is disposed at the same interval in the circumferential direction of the support cylinder 206, and is supported by the support cylinder 206 and the guide cylinder 208 so as to be movable in the radial direction while being biased outward by a plate spring 211.

A first piston guide 212 is fixed to the upper end of the support cylinder 206 by a bolt (not illustrated), a second piston guide 213 is fixed to the upper end of the first piston guide 212 by a bolt 214, and the upper end of the second piston guide 213 is fixed to the clamping cylinder 201 (the upper clamping cylinder 202) by a bolt 215. A first clamping piston 216 is disposed between the lower clamping cylinder 203 and the first piston guide 212, a second clamping piston 217 is disposed between the upper clamping cylinder 202 and the second piston guide 213, and the first clamping piston 216 and the second clamping piston 217 are integrally coupled to each other by a screw portion 218.

The first clamping piston 216 and the second clamping piston 217 have a cylindrical shape, and the first clamping piston 216 has a configuration in which a slope surface 216a is formed in the inner peripheral portion so that the thickness of the lower end gradually decreases. Meanwhile, each clamping piece 210 is provided with a slope surface 210a which has a curved shape in which the inner surface side thereof follows the outer surface of the instrumentation nozzle 83 (the in-core instrumentation cylinder 95) and the outer surface side thereof is formed so that a gap with respect to the lower clamping cylinder 203 gradually increases upward. Then, the lower end of the first clamping piston 216 enters between each clamping piece 210 and the lower clamping cylinder 203, and the slope surface 216a contacts the slope surface 210a of each clamping piece 210.

In the clamping cylinder 201, a chamber A is defined by the lower clamping cylinder 203, the first clamping piston 216, and the second clamping piston 217, and a first air supply port 219 for the chamber A is provided. Further, in the clamping cylinder 201, a chamber B is defined by the upper clamping cylinder 202, the lower clamping cylinder 203, and the second clamping piston 217, and a second air supply port 220 for the chamber B is formed.

Accordingly, when air is supplied from the first air supply port 219 to the chamber A, the second clamping piston 217 moves downward along with the first clamping piston 216, and the slope surface 216a presses the slope surface 210a of each clamping piece 210. Accordingly, each clamping piece 210 moves inward so as to clamp the instrumentation nozzle 83 (the in-core instrumentation cylinder 95). Meanwhile, when air is supplied from the second air supply port 220 to the chamber B, the first clamping piston 216 moves upward through the second clamping piston 217, and the slope surface 216a is separated from the slope surface 210a of each clamping piece 210. Then, each clamping piece 210 moves outward by the biasing force of the plate spring 211 so as to release the clamping operation for the instrumentation nozzle 83 (the in-core instrumentation cylinder 95).

In addition, the clamping mechanism of the invention capable of fixing the clamping cylinder 201 to the instrumentation nozzle 83 includes the first clamping piston 216, the second clamping piston 217, and each clamping piece 210. Further, the clamping cylinder of the invention includes the clamping cylinder 201, the support cylinder 206, the guide cylinder 208, and the piston guides 212 and 213.

Further, the support cylinder 206 and the first piston guide 212 are provided so that a nozzle guide (a positioning member) 221 is supported so as to be movable upward and downward therein. The nozzle guide 221 has a cylindrical shape, and an inner surface WJP nozzle 105 is insertable thereinto. The nozzle guide 221 is provided with a guide surface 221a of which the diameter therein decreases, and hence may guide a connection rod 105a of the inner surface WJP nozzle 105. Further, the nozzle guide 221 is formed by integrating a cylindrical portion 222 and a flange portion 223 provided at the lower end of the cylindrical portion 222. Then, the nozzle guide 221 is provided with a plurality of drainage holes 224 provided at the same interval in the circumferential direction so as to radially penetrate the flange portion 223. Each drainage hole 224 is formed so that one end thereof communicates with the inside of the nozzle guide 221 and the other end thereof communicates with a space portion (a predetermined gap) S between the nozzle guide 221 and the support cylinder 206 (the guide cylinder 208). In addition, the space portion S is formed so that the lower portion thereof is opened to the outside.

Accordingly, as illustrated in FIGS. 1 and 4, the water jet peening apparatus 101 moves downward, and the clamping device 103 moves downward to a predetermined position while being fitted to the outside of the instrumentation nozzle 83 (the in-core instrumentation cylinder 95). Then, the lower surface of the flange portion 223 of the nozzle guide 221 is stopped while contacting the upper end surface of the in-core instrumentation cylinder 95, so that the water jet peening apparatus 101 is positioned to a predetermined position of the instrumentation nozzle 83. Here, the instrumentation nozzle 83 (the in-core instrumentation cylinder 95) is clamped when each clamping piece 210 moves inward as described above.

Further, a detection device 231 is provided which detects a state where the nozzle guide 221 is positioned to a predetermined position of the instrumentation nozzle 83 when the water jet peening apparatus 101 moves downward so as to be fixed to a predetermined position of the instrumentation nozzle 83 (the in-core instrumentation cylinder 95).

In the detection device 231, as illustrated in FIGS. 5 and 6, the cylindrical nozzle guide 221 is supported so as to be movable upward and downward inside the support cylinder 206 and the first piston guide 212, and the lower end thereof is provide with the flange portion (the operation piece) 223. Further, a plurality of detection rods 232 is movably supported so as to penetrate the support cylinder 206 and the first piston guide 212 upward and downward at the outside of the nozzle guide 221, and the lower end thereof is able to contact the flange portion 223. A leading guide 233 is fixed to the lower portion of the second piston guide 213 (see FIG. 1), and the upper end of each detection rod 232 is fixed to a connection member 234 so as to penetrate the leading guide 233 upward. Then, a magnet 235 is fixed to the leading guide 233, and a magnet sensor 236 is fixed to the connection member 234.

Accordingly, the water jet peening apparatus 101 moves downward, and moves downward to a predetermined position while the clamping device 103 is fitted to the outside of the instrumentation nozzle 83 (the in-core instrumentation cylinder 95). Then, the lower surface of the flange portion 223 of the nozzle guide 221 comes into surface-contact with the upper end surface of the in-core instrumentation cylinder 95, and moves upward while being pressed by the in-core instrumentation cylinder 95. Then, each detection rod 232 moves upward with respect to the downward moving leading guide 233, and the magnet sensor 236 of the connection member 234 moves to a position facing the magnet 235 of the leading guide 233. Here, when the magnet sensor 236 detects the magnet 235 and notifies the detection result to an operator, the downward movement of the water jet peening apparatus 101 is stopped, and the water jet peening apparatus 101 is positioned to a predetermined position of the instrumentation nozzle 83.

Here, a method of performing a water jet peening operation on the inner surface of the instrumentation nozzle 83 (the in-core instrumentation cylinder 95) using the water jet peening apparatus 101 will be described.

As illustrated in FIG. 7, the water jet peening apparatus 101 is suspended by the movement crane 126 through the installation pole 111 while cooling water is stored in the cavity 122. The water jet peening apparatus 101 moves therefrom in the horizontal direction through the movement crane 126, and the water jet peening apparatus 101 moves downward through the electric hoist 127 while being positioned to the instrumentation nozzle 83.

Then, as illustrated in FIG. 6, the clamping cylinder 201 is fitted to the outside of the instrumentation nozzle 83, and the flange portion 223 of the nozzle guide 221 contacts the in-core instrumentation cylinder 95, so that the detection rod 232 moves upward along with the nozzle guide 221. Then, the detection device 231 detects this movement, and the operator stops the downward movement of the water jet peening apparatus 101. Here, when each clamping piece 210 moves inward, the instrumentation nozzle 83 is clamped, and the water jet peening apparatus 101 is fixed to the instrumentation nozzle 83.

When the water jet peening apparatus 101 is fixed to the instrumentation nozzle 83, the inner surface WJP nozzle 105 moves to the inside of the in-core instrumentation cylinder 95 through the clamping device 103 as illustrated in FIG. 4. Then, the inner surface WJP nozzle 105 moves downward in a rotation state while high-pressure water is jetted therefrom so that the high-pressure water including cavitation air bubbles is jetted from the inner surface WJP nozzle 105 to the inner surface of the in-core instrumentation cylinder 95. Accordingly, the residual tensile stress of the inner surface of the in-core instrumentation cylinder 95 is solved by the residual compressive stress. Meanwhile, the high-pressure water which is jetted from the inner surface WJP nozzle 105 moves upward inside the instrumentation nozzle 83 since the neutron flux detector 135 or the thimble tube 88 exists inside the conduit tube 85. Then, the high-pressure water flows outward through each drainage hole 224, and moves downward in the space portion S between the nozzle guide 221 and the support cylinder 206 (the guide cylinder 208) so as to be discharged to the outside.

In this way, the water jet peening apparatus of the first embodiment includes the clamping cylinder 201 which may be disposed at the outer peripheral side of the instrumentation nozzle 83 with a predetermined gap therebetween, the clamping piece 210 which may fix the clamping cylinder 201 to the instrumentation nozzle 83, the nozzle guide 221 which has a cylindrical shape, is provided inside the clamping cylinder 201, and is positioned to a position adjacent to the upper end of the instrumentation nozzle 83, the inner surface WJP nozzle 105 which may be movable upward and downward inside the nozzle guide 221, and the drainage hole 224 which radially penetrates the nozzle guide 221.

Accordingly, when the high-pressure water including cavitation air bubbles is jetted from the inner surface WJP nozzle 105 to the inner surface of the instrumentation nozzle 83 under water, the residual tensile stress of the inner surface of the instrumentation nozzle 83 is solved by the residual compressive stress, and the jetted high-pressure water is discharged from the drainage hole 224 of the nozzle guide 221 while not substantially giving any action to the neutron flux detector 135. Accordingly, it is possible to improve the safety of the operation by preventing the thimble tube 88 from being popped out due to the water jet peening operation.

In the water jet peening apparatus of the first embodiment, the lower end of the cylindrical portion 222 of the nozzle guide 221 is provided with the flange portion 223, and a plurality of drainage holes 224 is provided in the flange portion 223 at the same interval in the circumferential direction. Accordingly, the high-pressure water which is jetted from the inner surface WJP nozzle 105 is discharged highly efficiently from the plurality of drainage holes 224, and hence the draining performance may be improved.

In the water jet peening apparatus of the first embodiment, the nozzle guide 221 may be positioned to a position contacting the upper end of the instrumentation nozzle 83. Accordingly, the nozzle guide 221 and the instrumentation nozzle 83 are disposed without any gap, and hence the high-pressure water which is jetted from the inner surface WJP nozzle 105 may be appropriately led to the plurality of drainage holes 224.

The water jet peening apparatus of the first embodiment includes the detection device 231 which detects a state where the nozzle guide 221 is positioned to a predetermined position of the instrumentation nozzle 83. Accordingly, the water jet peening apparatus 101 may be highly precisely positioned to the instrumentation nozzle 83.

In the water jet peening apparatus of the first embodiment, the detection rod 232 which is supported by the clamping cylinder 201 so as to be movable upward and downward and of which the lower end indirectly may contact the upper end of the instrumentation nozzle 83 through the flange portion 223 and the magnet sensor 236 which detects the up and down position of the detection rod 232 are provided as the detection device 231. Accordingly, when the flange portion 223 of the nozzle guide 221 contacts the upper end of the instrumentation nozzle 83, the detection rod 232 moves upward by the flange portion 223. Accordingly, the upward movement is detected by the magnet sensor 236, and hence the water jet peening apparatus 101 may be highly precisely positioned to the instrumentation nozzle 83 with a simple configuration.

In the water jet peening apparatus of the first embodiment, the nozzle guide 221 is supported by the clamping cylinder 201 so as to be movable upward and downward, the flange portion 223 may come into surface-contact with the upper end surface of the instrumentation nozzle 83, and the detection rod 232 is movable upward and downward through the flange portion 223. Accordingly, when the flange portion 223 of the nozzle guide 221 comes into surface-contact with the upper end surface of the instrumentation nozzle 83, the detection rod 232 moves upward, and the movement of the nozzle guide 221 to a predetermined position is detected with high precision. Accordingly, the water jet peening apparatus 101 may be highly precisely positioned to the instrumentation nozzle 83.

In the water jet peening apparatus of the first embodiment, the detection rod 232 is disposed outside the nozzle guide 221. Accordingly, since the inner surface WJP nozzle 105 moves upward and downward inside the nozzle guide 221 and the detection rod 232 is disposed outside the nozzle guide 221, the stable water jet peening operation may be performed while the detection rod 232 does not disturb the up-and-down movement of the inner surface WJP nozzle 105.

Second Embodiment

Figure 14:
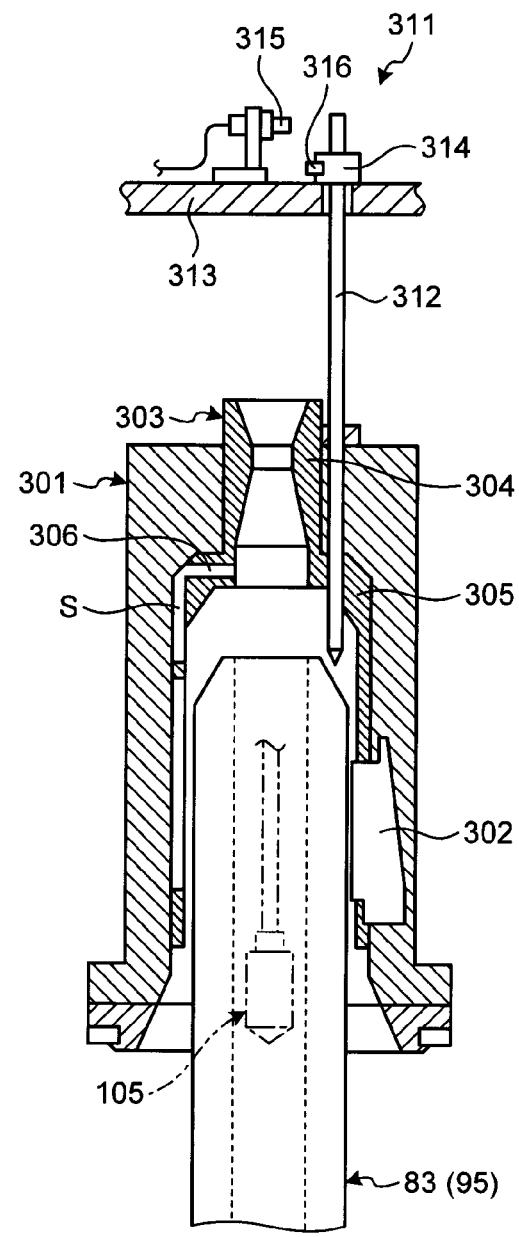
FIG. 14 is a longitudinal sectional view illustrating a clamping device of a water jet peening apparatus according to a second embodiment of the invention.
Figure 15:
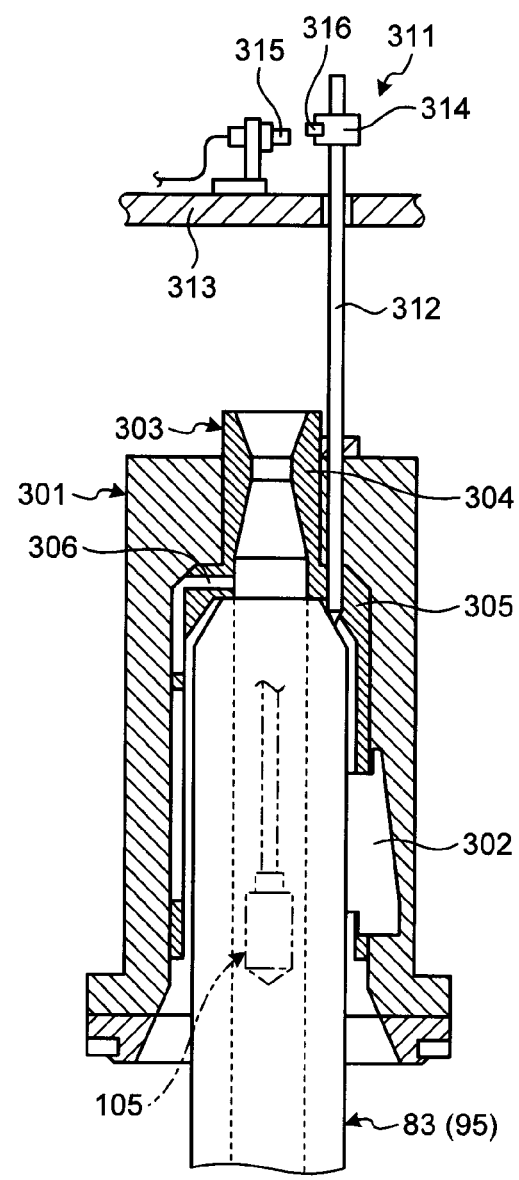
FIG. 15 is a schematic diagram illustrating an action of a detection device.

FIG. 14 is a longitudinal sectional view illustrating a clamping device of a water jet peening apparatus according to a second embodiment of the invention, and FIG. 15 is a schematic diagram illustrating an action of a detection device. In addition, the same reference sign will be given to the member having the same function as the above-described embodiment, and the detailed description thereof will not be repeated.

In the clamping device of the water jet peening apparatus according to the second embodiment, as illustrated in FIGS. 14 and 15, a clamping cylinder 301 includes a plurality of clamping pieces (clamping mechanisms) 302 therein and hence may clamp the instrumentation nozzle 83 (the in-core instrumentation cylinder 95) by the inward movement of a clamping piston (not illustrated). A nozzle guide (a positioning member) 303 is fixed into the clamping cylinder 301. The nozzle guide 303 has a cylindrical shape, and the inner surface WJP nozzle 105 is insertable thereinto. The nozzle guide 303 is obtained by integrating a cylindrical portion 304 and a flange portion 305 provided at the lower end of the cylindrical portion 304. Then, the nozzle guide 303 is provided with a plurality of drainage holes 306 provided at the same interval in the circumferential direction so as to radially penetrate the flange portion 305. Each drainage hole 306 has a configuration in which one end thereof communicates with the inside of the nozzle guide 303 and the other end thereof communicates with a space portion (a predetermined gap) S between the nozzle guide 303 and the clamping cylinder 301. In addition, the lower portion of the space portion S is opened to the outside.

Accordingly, the water jet peening apparatus 101 (see FIG. 10) moves downward, and moves downward to a predetermined position while the clamping cylinder 301 is fitted to the outside of the instrumentation nozzle 83 (the in-core instrumentation cylinder 95). Then, the lower surface of the flange portion 305 of the nozzle guide 303 is stopped while contacting the upper end surface of the in-core instrumentation cylinder 95, and hence the water jet peening apparatus 101 is positioned to a predetermined position of the instrumentation nozzle 83. Here, the instrumentation nozzle 83 (the in-core instrumentation cylinder 95) may be clamped by the inward movement of the clamping piece 302.

Further, a detection device 311 is provided which detects a state where the nozzle guide 303 is positioned to a predetermined position of the instrumentation nozzle 83 when the water jet peening apparatus 101 moves downward so as to be fixed to a predetermined position of the instrumentation nozzle 83 (the in-core instrumentation cylinder 95).

In the detection device 311, a plurality of detection rods 312 is supported so as to be movable upward and downward while penetrating the flange portion 305 outside the nozzle guide 303, and each lower end may contact the upper end of the instrumentation nozzle 83 (the in-core instrumentation cylinder 95). A leading guide 313 is fixed to the clamping cylinder 301, and a connection member 314 is fixed to the upper end of each detection rod 312 while the detection rod penetrates the leading guide 313 upward. Then, a magnet sensor 315 is fixed to the leading guide 313, and a magnet 316 is fixed to the connection member 314.

Accordingly, the water jet peening apparatus 101 moves downward, and moves downward to a predetermined position while the clamping cylinder 301 is fitted to the outside of the instrumentation nozzle 83 (the in-core instrumentation cylinder 95). Then, the lower end of the detection rod 312 contacts the upper end of the in-core instrumentation cylinder 95, and moves upward while being pressed by the in-core instrumentation cylinder 95. At this time, the lower surface of the flange portion 305 of the nozzle guide 303 comes into surface-contact with the upper end surface of the in-core instrumentation cylinder 95. Then, the detection rod 312 moves upward with respect to the downward moving clamping cylinder 301, and the magnet 316 of the connection member 314 moves to a position facing the magnet sensor 315 of the leading guide 313. Here, when the magnet sensor 315 detects the magnet 316 and notifies the detection result to the operator, the downward movement of the water jet peening apparatus 101 is stopped, and the water jet peening apparatus 101 is positioned to a predetermined position of the instrumentation nozzle 83.

Here, a method of performing a water jet peening operation on the inner surface of the instrumentation nozzle 83 (the in-core instrumentation cylinder 95) using the water jet peening apparatus 101 will be described.

When the water jet peening apparatus 101 moves downward, the clamping cylinder 301 is fitted to the outside of the instrumentation nozzle 83, and the lower end of the detection rod 312 moves upward while contacting the in-core instrumentation cylinder 95. Then, the detection device 311 detects this movement, and the operator stops the downward movement of the water jet peening apparatus 101. Here, the instrumentation nozzle 83 is clamped by the inward movement of each clamping piece 302, and hence the water jet peening apparatus 101 is fixed to the instrumentation nozzle 83.

When the water jet peening apparatus 101 is fixed to the instrumentation nozzle 83, the inner surface WJP nozzle 105 moves downward into the in-core instrumentation cylinder 95. Then, the inner surface WJP nozzle 105 moves downward in a rotation state while high-pressure water is jetted therefrom so that the high-pressure water including cavitation air bubbles is jetted from the inner surface WJP nozzle 105 to the inner surface of the in-core instrumentation cylinder 95. Accordingly, the residual tensile stress of the inner surface of the in-core instrumentation cylinder 95 is solved by the residual compressive stress. Meanwhile, the jetted high-pressure water is discharged from the drainage hole 306 of the nozzle guide 303 to the space portion S while not substantially giving any action to the neutron flux detector 135, and moves downward so as to be discharged to the outside.

In this way, the water jet peening apparatus of the second embodiment includes the clamping cylinder 301 which may be disposed at the outer peripheral side of the instrumentation nozzle 83 with a predetermined gap therebetween, the clamping piece 302 which may fix the clamping cylinder 301 to the instrumentation nozzle 83, the nozzle guide 303 which has a cylindrical shape, is provided inside the clamping cylinder 301, and is positioned to a position adjacent to the upper end of the instrumentation nozzle 83, the inner surface WJP nozzle 105 which is movable upward and downward inside the nozzle guide 303, and the drainage hole 306 which radially penetrates the nozzle guide 303.

Accordingly, when the high-pressure water including cavitation air bubbles is jetted from the inner surface WJP nozzle 105 to the inner surface of the instrumentation nozzle 83 under water, the residual tensile stress of the inner surface of the instrumentation nozzle 83 is solved by the residual compressive stress, and the jetted high-pressure water is discharged from the drainage hole 306 of the nozzle guide 303 while not substantially giving any action to the neutron flux detector 135. Accordingly, it is possible to improve the safety of the operation by preventing the thimble tube 88 from being popped out due to the water jet peening operation.

Third Embodiment

Figure 16:
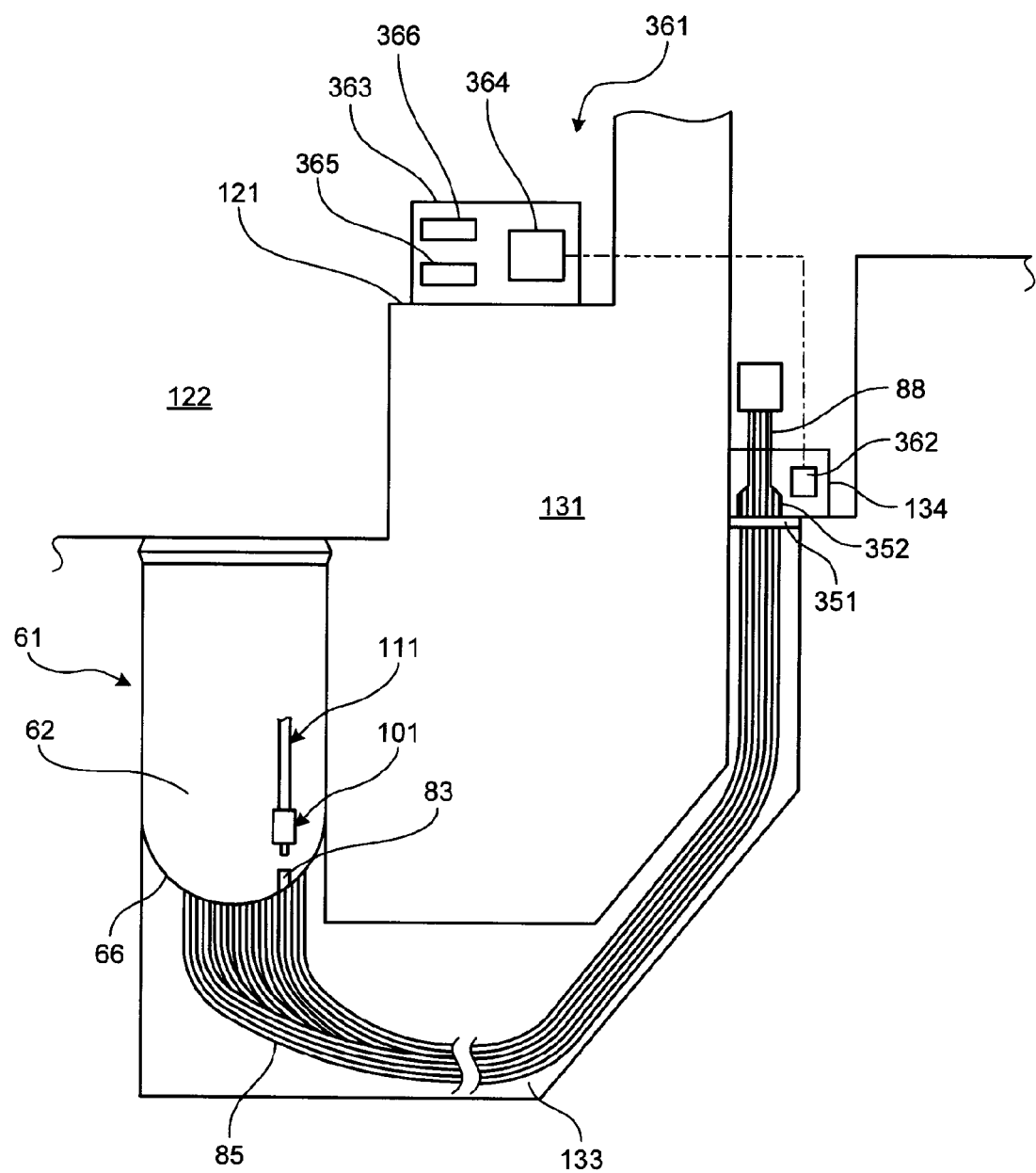
FIG. 16 is a schematic diagram illustrating an entire configuration of a water jet peening apparatus according to a third embodiment of the invention.
Figure 17:
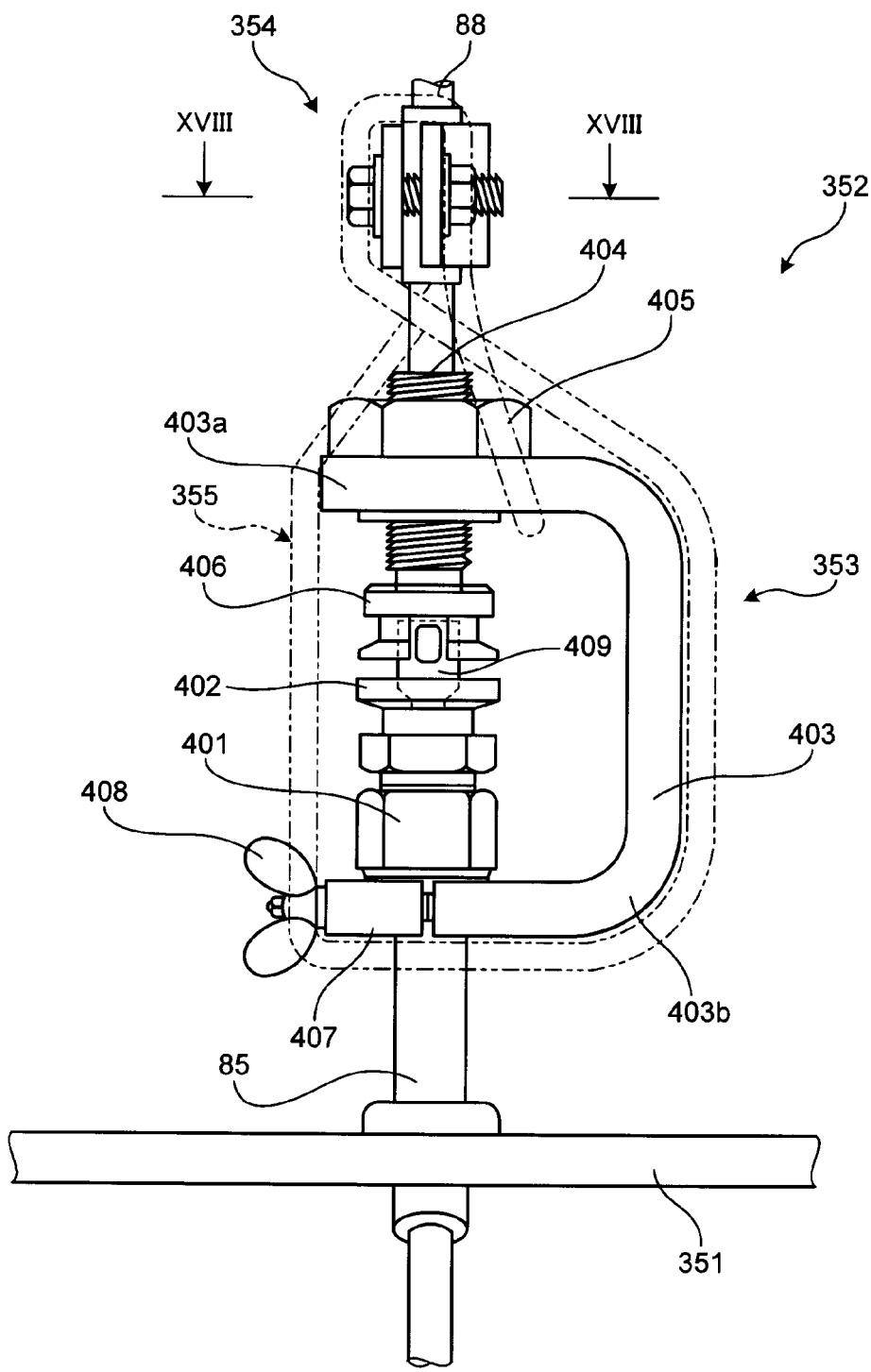
FIG. 17 is a schematic diagram illustrating a fixing device.
Figure 18:
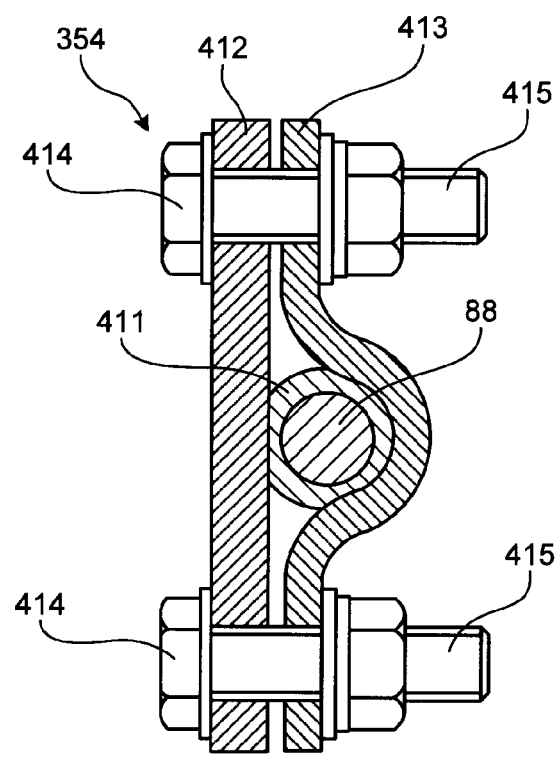
FIG. 18 is a cross-sectional view taken along the line XVIII-XVIII of FIG. 17.

FIG. 16 is a schematic diagram illustrating an entire configuration of a water jet peening apparatus according to a third embodiment of the invention, FIG. 17 is a schematic diagram illustrating a fixing device, and FIG. 18 is a cross-sectional view taken along the line XVIII-XVIII of FIG. 17. In addition, the same reference sign will be given to the member having the same function as the above-described first embodiment, and the detailed description thereof will not be repeated.

In the third embodiment, as illustrated in FIG. 16, the water jet peening apparatus 101 is fixed to the instrumentation nozzle 83 which is provided in the lower end plate (the semi-spherical portion) 66 of the nuclear reactor vessel 61 (the nuclear reactor vessel body 62). That is, the installation pole 111 extends downward from the working floor 121, and the water jet peening apparatus 101 is connected to the lower end thereof. The plurality of conduit tubes 85 is curved so as to be drawn around the thimble tube piping chamber 133 while one ends are connected to the instrumentation nozzle 83 of the lower end plate 66 and the other ends are disposed in a monitoring chamber 134 in a collected state.

The conduit tube 85 is provided so that the other end extends to a seal table 351 provided in the monitoring chamber 134 so as to be connected thereto and the front end is provided with the thimble tube 88 to which a neutron flux detector (not illustrated) is attached. The thimble tube 88 is insertable from the monitoring chamber 134 into the other end of the conduit tube 85, and is insertable into the nuclear reactor vessel 61 through the instrumentation nozzle 83. Then, a fixing device 352 is provided which does not allow the end of the thimble tube 88, drawn from the other end of the conduit tube 85 in the monitoring chamber 134, to be movable with respect to the conduit tube 85.

As illustrated in FIGS. 17 and 18, the fixing device 352 includes a first fixing jig 353 which is fixed to the end of the conduit tube 85, a second fixing jig 354 which is fixed to the thimble tube 88 drawn from the end of the conduit tube 85, and a connection member 355 which suppresses the separation of the first fixing jig 353 and the second fixing jig 354.

That is, in the first fixing jig 353, the conduit tube 85 extends upward so that the end penetrates the seal table 351 and a nut 401 and a joint lower body 402 are fixed to the outer peripheral portion thereof. A metal fastener 403 has a U-shape in the lateral direction, and is fixed by a fixing nut 405 while a packing metal fastener 404 is threaded into an upper flange portion 403a, and a packing pressing metal fastener 406 is fixed to the lower portion thereof. The conduit tube 85 is nipped by a metal fastener 407 in a lower flange portion 403b of the metal fastener 403, and is fixed by a mounting screw 408. Then, a low-pressure sealing rubber packing 409 is fixed in a compressed state between the joint lower body 402 and the packing pressing metal fastener 406. In addition, the thimble tube 88 inside the conduit tube 85 is drawn upward from the packing metal fastener 404.

In the second fixing jig 354, a rubber plate 411 is wound around the thimble tube 88, and the thimble tube is nipped by a first plate 412 having a flat shape and a second plate 413 having a shape of which the middle portion is curved. Then, the first plate 412 and the second plate 413 are integrally fixed to each other by a coupling bolt 414 and a coupling nut 415 provided at both sides of the nipped thimble tube 88.

The connection member 355 is a soft rope such as a string, a cable, and a wire, and is wound around the first fixing jig 353 and the second fixing jig 354 so as to suppress the separation therebetween. In addition, the connection member 355 is not limited to the soft rope. For example, a hard connection rod or a connection plate may be used.

Further, a monitoring device 361 which monitors the fixed state of the thimble tube 88 and the conduit tube 85 using the fixing device 352 is provided. The monitoring device 361 includes a camera 362 which is disposed inside the monitoring chamber 134 so as to capture the image of the fixing device 352 and a monitoring unit 364 which is provided in a working chamber 363 provided in the working floor 121. Then, the monitoring unit 364 is connected to an operation device 365 and a display (a display device) 366. Then, the camera 362 may output a captured image to the monitoring unit 364, and the operator in the working chamber 363 may monitor the fixed state of the thimble tube 88 and the conduit tube 85 using the fixing device 352 through the display 366.

Here, a method of performing a water jet peening operation on the inner surface of the instrumentation nozzle 83 using the water jet peening apparatus 101 will be described.

As illustrated in FIGS. 1, 4, and 16, the water jet peening method of the embodiment includes: disposing the clamping cylinder 201 at the outer peripheral side of the instrumentation nozzle 83 with a predetermined gap therebetween, fixing the nozzle guide (the positioning member) 221 provided in the clamping cylinder 201 to the instrumentation nozzle 83 at a position adjacent to the upper end of the instrumentation nozzle 83, allowing the thimble tube 88 drawn from the instrumentation nozzle 83 to the outside through the conduit tube 85 to be immovable, moving the inner surface WJP nozzle 105 downward to the instrumentation nozzle 83 through the clamping cylinder 201, jetting high-pressure water to the inner surface of the instrumentation nozzle 83 by moving the inner surface WJP nozzle 105 downward in a rotation state while jetting the high-pressure water including cavitation air bubbles from the inner surface WJP nozzle 105, and discharging the high-pressure water which is jetted from the inner surface WJP nozzle 105 from the drainage hole 224 provided in the nozzle guide 221 to the outside.

Further, the fixed state of the thimble tube 88 and the conduit tube 85 is monitored when the high-pressure water is jetted from the inner surface WJP nozzle 105 to the inner surface of the instrumentation nozzle 83.

In this way, in the water jet peening apparatus of the third embodiment, the fixing device 352 is provided which does not allow the end of the thimble tube 88 drawn from the other end of the conduit tube 85 to be movable with respect to the conduit tube 85.

Accordingly, since the thimble tube 88 which is drawn from the other end of the conduit tube 85 is immovably fixed by the fixing device 352, it is possible to reliably prevent the thimble tube 88 from being popped out due to the water jet peening operation.

In the water jet peening apparatus of the third embodiment, the first fixing jig 353 which is fixed to the conduit tube 85 extending inside the monitoring chamber 134, the second fixing jig 354 which is fixed to the end of the thimble tube 88 drawn from the other end of the conduit tube 85, and the connection member 355 which suppresses the separation between the first fixing jig 353 and the second fixing jig 354 are provided as the fixing device 352. Accordingly, it is possible to easily prevent the thimble tube 88 from being popped out due to the water jet peening operation with a simple configuration.

In the water jet peening apparatus of the third embodiment, the monitoring device 361 is provided which monitors the fixed state of the thimble tube 88 and the conduit tube 85. Accordingly, since the fixed state of the thimble tube 88 and the conduit tube 85 is monitored by the monitoring device 361, it is possible to prevent the thimble tube 88 from being popped out due to the water jet peening operation.

Further, the water jet peening method of the third embodiment includes: disposing the clamping cylinder 201 at the outer peripheral side of the instrumentation nozzle 83 with a predetermined gap therebetween, fixing the nozzle guide (the positioning member) 221 provided in the clamping cylinder 201 to the instrumentation nozzle 83 at a position adjacent to the upper end of the instrumentation nozzle 83, allowing the thimble tube 88 drawn from the instrumentation nozzle 83 to the outside through the conduit tube 85 to be immovable, moving the inner surface WJP nozzle 105 downward to the instrumentation nozzle 83 through the clamping cylinder 201, jetting high-pressure water to the inner surface of the instrumentation nozzle 83 by moving the inner surface WJP nozzle 105 downward in a rotation state while jetting the high-pressure water including cavitation air bubbles from the inner surface WJP nozzle 105, and discharging the high-pressure water which is jetted from the inner surface WJP nozzle 105 from the drainage hole 224 provided in the nozzle guide 221 to the outside.

Accordingly, when the high-pressure water including cavitation air bubbles is jetted from the inner surface WJP nozzle 105 to the inner surface of the instrumentation nozzle 83 under water, the residual tensile stress of the inner surface of the instrumentation nozzle 83 is solved by the residual compressive stress, and the jetted high-pressure water is discharged from the drainage hole 224 of the nozzle guide 221 while not substantially giving any action to the neutron flux detector 135. Accordingly, it is possible to improve the safety of the operation by preventing the thimble tube 88 from being popped out due to the water jet peening operation. Further, since the high-pressure water is jetted while the thimble tube 88 drawn to the outside from the instrumentation nozzle 83 through the conduit tube 85 is immovably fixed, it is possible to reliably prevent the thimble tube 88 from being popped out due to the water jet peening operation.

In the water jet peening method of the third embodiment, the fixed state of the thimble tube 88 and the conduit tube 85 is monitored when the high-pressure water is jetted from the inner surface WJP nozzle 105 to the inner surface of the instrumentation nozzle 83. Accordingly, it is possible to prevent the thimble tube 88 from being popped out due to the water jet peening operation.

REFERENCE SIGNS LIST

61 NUCLEAR REACTOR VESSEL
62 NUCLEAR REACTOR VESSEL BODY
63 NUCLEAR REACTOR VESSEL HEAD
66 LOWER END PLATE (SEMI-SPHERICAL PORTION)
83 INSTRUMENTATION NOZZLE
85 CONDUIT TUBE
88 THIMBLE TUBE
95 IN-CORE INSTRUMENTATION CYLINDER
101 WATER JET PEENING APPARATUS (NUCLEAR REACTOR REPAIRING APPARATUS)
102 APPARATUS BODY
103 CLAMPING DEVICE
105 INNER SURFACE WJP NOZZLE
201, 301 CLAMPING CYLINDER
206 SUPPORT CYLINDER
208 GUIDE CYLINDER
210, 302 CLAMPING PIECE (CLAMPING MECHANISM)
212 FIRST PISTON GUIDE
213 SECOND PISTON GUIDE
216 FIRST CLAMPING PISTON
217 SECOND CLAMPING PISTON
221, 303 NOZZLE GUIDE (POSITIONING MEMBER)
231, 311 DETECTION DEVICE
352 FIXING DEVICE
353 FIRST FIXING JIG
354 SECOND FIXING JIG
355 CONNECTION MEMBER
361 MONITORING DEVICE

The invention claimed is:
1. A water jet peening (WJP) method for a nuclear reactor vessel comprising:
disposing a clamping cylinder at the outer peripheral side of an instrumentation nozzle with a predetermined gap therebetween;
fixing a positioning member provided in the clamping cylinder to the instrumentation nozzle at a position adjacent to the upper end of the instrumentation nozzle;

moving an inner surface WJP nozzle downward to the instrumentation nozzle through the clamping cylinder;

jetting high-pressure water to an inner surface of the instrumentation nozzle by moving the inner surface WJP nozzle downward in a rotation state while the high-pressure water including cavitation air bubbles is jetted from the inner surface WJP nozzle; and discharging the high-pressure water jetted from the inner surface WJP nozzle to an outside of the instrumentation nozzle through a drainage hole provided in the positioning member.

2. The water jet peening method according to claim 1, wherein the high-pressure water is jetted from the inner surface WJP nozzle while a thimble tube drawn to an outside of the reactor vessel from the instrumentation nozzle through a conduit tube is not movable.

3. The water jet peening method according to claim 2, wherein a fixed state of the thimble tube and the conduit tube is monitored when the high-pressure water is jetted from the inner surface WJP nozzle to the inner surface of the instrumentation nozzle.

* * * * *